United States Patent
Schweizer et al.

(10) Patent No.: US 11,735,928 B2
(45) Date of Patent: Aug. 22, 2023

(54) MULTI-PORT GRID FORMING CONTROL FOR GRID INTERTIES

(71) Applicant: Hitachi Energy Switzerland AG, Baden (CH)

(72) Inventors: Mario Schweizer, Rütihof (CH); Stefan Almer, Zürich (CH); Lennart Harnefors, Västerås (SE)

(73) Assignee: Hitachi Energy Switzerland AG, Baden (CH)

( * ) Notice: Subject to any disclaimer, the term of this patent is extended or adjusted under 35 U.S.C. 154(b) by 0 days.

(21) Appl. No.: 17/919,354

(22) PCT Filed: Apr. 17, 2020

(86) PCT No.: PCT/EP2020/060855
§ 371 (c)(1),
(2) Date: Oct. 17, 2022

(87) PCT Pub. No.: WO2021/209154
PCT Pub. Date: Oct. 21, 2021

(65) Prior Publication Data
US 2023/0145847 A1    May 11, 2023

(51) Int. Cl.
*H02J 3/36*    (2006.01)
*H02J 3/40*    (2006.01)
*H02J 3/46*    (2006.01)

(52) U.S. Cl.
CPC .................... *H02J 3/40* (2013.01); *H02J 3/36* (2013.01); *H02J 3/46* (2013.01); *H02J 2203/10* (2020.01); *H02J 2203/20* (2020.01)

(58) Field of Classification Search
CPC ........ H02J 3/36; H02J 3/40; H02J 3/46; H02J 2203/10; H02J 2203/20
See application file for complete search history.

(56) References Cited

U.S. PATENT DOCUMENTS

2018/0145582 A1    5/2018   Shuai et al.

FOREIGN PATENT DOCUMENTS

CN    106329549 A    1/2017
CN    107342596 A    11/2017
(Continued)

OTHER PUBLICATIONS

Francesco Palombi, Luigi Piegari, Salvatore D'Arco; Impacton Power System Frequency Dynamics from an HVDC Transmission System with Converter Stations Controlled as Virtual Synchronous Machines; 2019 IEEE Milan Power Tech; Jun. 27, 2019; 6 pages . (Year: 2019).*

(Continued)

*Primary Examiner* — Harry R Behm
(74) *Attorney, Agent, or Firm* — Slater Matsil, LLP

(57) ABSTRACT

A grid forming vector current control system can be used for controlling a grid intertie. A first terminal is connected to a first power grid and a second terminal is connected to a second power grid. The terminals each include current control unit, a virtual admittance unit, and a phase locked loop (PLL) unit. The virtual admittance unit and the PLL unit are configured to emulate an inertia of a virtual synchronous machine (VSM) and a virtual current source is connected in parallel to the VSM. A controller is configured to use transient power consumed by the first VSM to generate a power-equivalent current reference to control the second virtual current source and to use transient power consumed by the second VSM to generate a power-equivalent current reference to control the first virtual current source.

18 Claims, 19 Drawing Sheets

(56) References Cited

FOREIGN PATENT DOCUMENTS

| CN | 108011390 A | | 5/2018 | |
|---|---|---|---|---|
| CN | 108173278 A | | 6/2018 | |
| CN | 108493984 A | | 9/2018 | |
| CN | 109217346 A | | 1/2019 | |
| CN | 109586336 A | | 4/2019 | |
| CN | 110601272 A | * | 12/2019 | |
| CN | 112600232 A | * | 4/2021 | ............... H02J 3/36 |
| ES | 2724564 A1 | * | 9/2019 | |

OTHER PUBLICATIONS

D'Arco, S., et al., "Virtual Synchronous Machines—Classifications of Implementations and Analysis of Equivalence to Droop Controllers for Microgrids", 2013 IEEE Grenoble Conference, Jun. 16-20, 2013, 7 pages.

Liu, H., et al., "Voltage Stability and Control of Offshore Wind Farms With AC Collection and HVDC Transmission", IEEE Journal of Emerging and Selected Topics in Power Electronics, vol. 2, No. 4, Dec. 2014, pp. 1181-1189.

Miao, Z., et al., "Wind Farms With HVdc Delivery in Inertial Response and Primary Frequency Control", IEEE Transactions on Energy Conversion, vol. 25, No. 4, Dec. 2010, pp. 1171-1178.

Roldán-Pérez, et al., "Virtual Synchronous Machine Control of VSC HVDC for Power System Oscillation Damping", IECON 2018—44th Annual Conference of the IEEE Industrial Electronics Society, Oct. 21-23, 2018, pp. 6026-6031.

Terazono, D., et al., "Smart Motor Drive Providing Inertia Support for the Grid by Applying Virtual Synchronous Generator Control", 10th International Conference on Power Electronics—ECCE Asia, May 27-30, 2019, pp. 493-499.

Zhang, M., et al., "Inertia and Primary Frequency Provisions of PLL-Synchronized VSC HVDC When Attached to Islanded AC System", IEEE Transactions on Power Systems, vol. 33, No. 4, Jul. 2018, pp. 4179-4188.

Zhu, J., et al., "Inertia Emulation Control Strategy for VSC-HVDC Transmission Systems", IEEE Transactions on Power Systems, vol. 28, No. 2, May 2013, pp. 1277-1287.

* cited by examiner

MULTI-PORT GRID FORMING CONTROL FOR GRID INTERTIES

CROSS-REFERENCE TO RELATED APPLICATIONS

This application is a national stage application of International Application No. PCT/EP2020/060855, filed on Apr. 17, 2020, which application is hereby incorporated herein by reference.

TECHNICAL FIELD

The present disclosure relates to a system and method for multi-port grid forming control for grid interties.

BACKGROUND

The rate of change of the transmission and distribution grid is traditionally high. Conventional generation with synchronous generators is replaced more and more by converter-interfaced renewable energy resources. It has been shown in many studies that there is a risk of grid instability if the utility grid is equipped with a high amount of renewable energy resources that do not employ any grid supporting control strategy. The reason of the instability is that such resources do not adapt their power injection to the grid according to the actual power demand in the grid.

Such grid-agnostic current/power control strategies were common in most converter-interfaced applications for a long time. However, in the last decades, more stringent regulations have been put in place, e.g., for photovoltaic (PV) inverters. Today, PV inverters have to gradually reduce the injected active power if the grid frequency increases above nominal. This behavior is a first step into the direction of grid-supporting power converter control. The injected active power is slowly adapted in response to the actual needs of the grid. Such a simple method only provides steady-state grid support, i.e. it still relies on synchronous generators in the grid that take over transient load changes.

In the meantime, more sophisticated converter control methods have been developed for insular grids, microgrids and railway grids. These control methods aim to provide not only steady-state grid support but also transient grid support. Converter-interfaced energy resources with such control methods are able to fully replace conventional synchronous generators in the grid. It is possible to run a grid without any conventional synchronous generator connected to it, a situation that has become common, e.g., in railway grids already.

In order to provide a full grid support, it is necessary that the amount of injected power to the grid is adapted according to the demand of the various loads connected to the grid. This is achieved by changing the behavior from grid-agnostic constant power injection to a behavior that is closer to a voltage source. The converters equipped with such control methods adapt and share the injected power automatically such that they provide the actual power demanded from the various loads in the grid.

Because of backwards-compatibility reasons with legacy equipment in AC power generation and distribution, the control methods aim to provide "inertia" to the grid, meaning that the rate of change of the grid frequency is limited.

The combined effect of voltage source characteristics and inertia leads to characteristics that are very close to the behavior of a synchronous generator. Such control methods provide full grid support and can fully replace synchronous generators in the grid.

In general, control mechanisms according to the state of the art may be classified into two main groups.

In droop control approaches, the control law is based on the steady-state coupling of frequency (or angle) and power flow in inductive grids. Various implementation variants exist and several ways of improving the method have been proposed over the last years. In most implementation variants, the method creates a voltage reference which has to be tracked with additional cascaded voltage- and current control loops.

In virtual generator approaches, the control law is based on the principle of emulating the behavior of a synchronous generator. The mathematical model describing the behavior of the generator is implemented in the controller directly. Various implementation variants exist that differ mainly in the level of detail and the complexity of the implemented equations.

In order to emulate a virtual generator or virtual synchronous machine (VSM), the mathematical equations of a synchronous generator are implemented in a controller to emulate the behavior of the generator. In the direct approach (voltage source type), the machine equations are solved for the stator voltage which is given as a reference either directly to the modulation stage or to subsequent cascaded voltage and current control loops. In the inverse method (current source type), the machine equations are solved for the stator currents which are given as references to subsequent current control loops.

However, both approaches cited above require various additional control loops in order to make the concept applicable. In particular, cascaded voltage and current control loops given by the direct method and provide current control including current limitation.

A current control loop and PLL track the active/reactive power references given by the inverse method and provide current control including current limitation. Also, grid synchronization and grid frequency measurement are provided.

A virtual impedance loop may emulate a virtual stator impedance.

Additional components may be used to improve the performance of the virtual generator. The additional components may be at least one of the following:

An additional PLL for the direct method for synchronization with the grid before closing the main circuit breaker (MCB) of the converter or during fault cases, an automatic voltage regulator (AVR) to improve the voltage regulation at the PCC and feedforward gains for the grid current and the PCC voltage to improve the performance of the PI control loops. A damper winding emulation is used to improve damping of low-frequency oscillations. In the simplest inverse method, the virtual inertia effect is emulated with a derivative of the measured grid frequency. Furthermore, low-pass filtering the virtual impedance reference is often required to reduce amplification of high frequency noise caused by the derivative used for the calculation of a virtual inductance.

However, systems according to the state-of-the-art may be difficult to tune and require a high commissioning effort. There may also be interactions between control loops due to insufficient bandwidth separation in converters with lower switching frequency. In regular systems, typically around fifteen parameters have to be tuned with unknown interactions. In strong grids, insufficient reference tracking performance often occurs. Furthermore, a loss of synchronism during faults may appear.

SUMMARY

The present disclosure relates to a system and method for a grid forming vector current control, in particular for multi-port grid forming control for grid interties.

In one embodiment, a grid forming vector current control system for controlling a grid intertie is provided. The system comprises a first terminal configured to be connected to a first power grid. The first terminal comprises a first current control unit, a first virtual admittance unit, and a first phase locked loop (PLL) unit. The first virtual admittance unit and the first PLL unit are configured to emulate an inertia of a first virtual synchronous machine (VSM) and a first virtual current source is connected in parallel to the first VSM.

The system also comprises a second terminal configured to be connected to a second power grid. The second terminal comprises a second current control unit, a second virtual admittance unit, and a second PLL unit. The second virtual admittance unit and the second PLL unit are configured to emulate an inertia of a second VSM and a second virtual current source is connected in parallel to the second VSM. A controller is configured to use the transient power consumed by the first VSM to generate a power-equivalent current reference to control the second virtual current source and to use the transient power consumed by the second VSM to generate a power-equivalent current reference to control the first virtual current source.

Other embodiments and features are disclosed herein.

BRIEF DESCRIPTION OF THE DRAWINGS

It should be noted that for clarity and ease of illustration these drawings are not necessarily drawn to scale.

DETAILED DESCRIPTION OF ILLUSTRATIVE EMBODIMENTS

Figure 1:
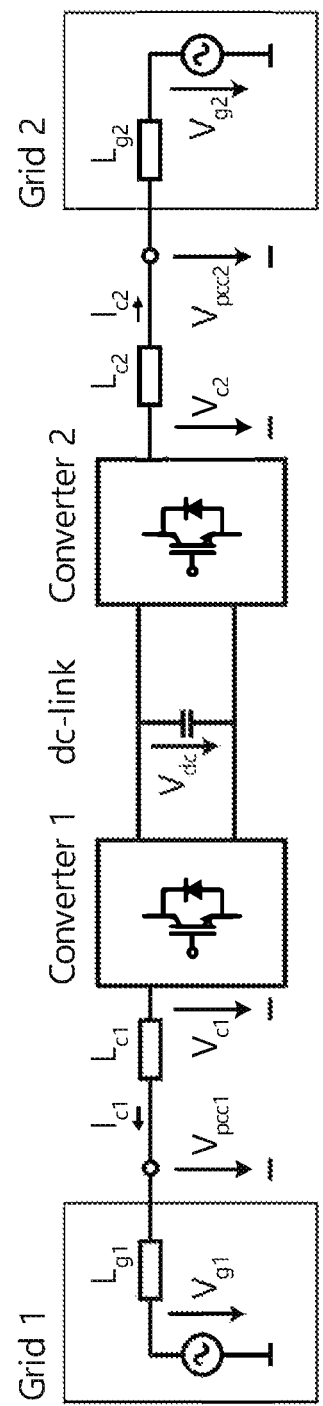
FIG. 1 shows an example of a schematic diagram of a grid intertie/HVDC link according to the prior art.

As discussed in the Background section, grid supporting control methods become more and more important in various applications, such as grid connected battery energy storage (BESS), microgrids, PV inverters, railway interties, high-voltage direct current (HVDC) and uninterruptible power supply (UPS). Transmissions system operators (TSOs) in various countries are discussing about changing standards for grid connected energy resources in such a way that grid support becomes mandatory for all grid connected energy sources. Today's grid supporting control methods are predominantly based on two basic concepts, the "virtual generator" concept and the droop control concept. Both methods have several shortcomings such as high complexity, difficult tuning approach with high commissioning effort, and stability issues. Furthermore, the mentioned methods may not offer sufficient control performance at the same time in strong grids and in weak grids and therefore either need retuning or control mode changeover during islanding events.

Besides converter-interfaced renewable energy sources, in particular transmission of bulk power over large distance with HVDC lines and coupling of different grids, e.g., 3-phase utility grid with i-phase railway grids, become more and more important in the modern power grid. Conventionally, such interconnectors are controlled with constant power control or with steady-state grid support only. Recently, it was proposed to provide full grid support with HVDC lines or railway interties using virtual synchronous generator control.

However, the solutions according to the state of the art can only provide full grid support on one side of the link, i.e., it is not possible to provide full grid support on both terminals of the HVDC link or the grid intertie station without excessive energy storage in the dc-link between the two terminals. However, in particular TSOs would prefer a solution having full grid-support characteristics on both sides of the terminal.

Existing control methods for HVDC lines and railway interties can be classified into the following solutions:

Stiff current/power control on both terminals to transmit a given amount of active/reactive power from one terminal to the other. An extension of the method allows to emulate inertia on one terminal using the derivative of grid frequency. Usually, the other terminal is determined to control the dc-link voltage and does not provide any inertia.

Stiff current/power control on one side and grid supporting control on the other side of the terminal. The grid supporting terminal could be equipped with steady-state droop control only or with a full virtual synchronous generator control. The terminal with the stiff power control is determined to control the dc-link voltage.

Stiff current control on one side and grid forming control on the other side of the terminal. This mode is used, e.g., to connect an off-shore windfarm to the utility grid. The off-shore terminal emulates a voltage source that provides the local slack-bus for the wind-farm. The terminal with the stiff power control is determined to control the dc-link voltage.

Grid supporting control on one or both terminals with excessive energy storage in the dc-link.

Figure 2:
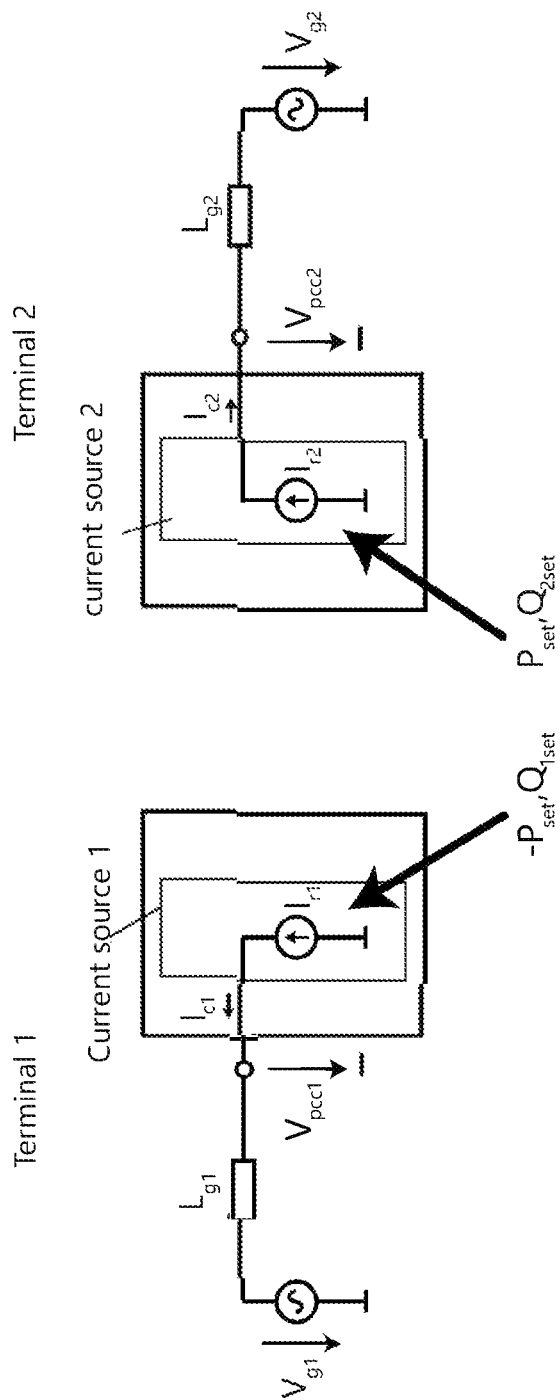
FIG. 2 shows an example of a schematic diagram of a grid intertie/HVDC link according to the prior art.

FIG. 1 shows an example of a schematic diagram of a grid intertie/HVDC link according to the prior art. The dc-link in this case is represented by a capacitor bank. According to the prior art, both terminals are controlled using vector current control (VCC) or an equivalent current control scheme, such that the behavior of both converter terminals can be modelled with an equivalent current source (see FIG. 2). A certain amount of power ($P_{tr}$) can be transferred over the link by giving the correct set-points for the current control on both terminals. Reactive power can be injected on both terminals independently. Assuming vector current control in the synchronous (dq) reference frame, it is required to calculate correct set-points for the current controller in d- and q-coordinates. Assuming steady-state, i.e., each PLL reference frame is aligned to the corresponding voltage at the PCCs, the set-points are given as $$I_{1d,ref} = -\frac{2}{3} \cdot \frac{P_{tr}}{V_{pcc1,d}} + i^*_{Vdc,ctrl}$$

$$I_{1q,ref} = \frac{2}{3} \cdot \frac{Q_{set,1}}{V_{pcc1,d}}$$

$$I_{2d,ref} = \frac{2}{3} \cdot \frac{P_{tr}}{V_{pcc2,d}}$$

$$I_{2q,ref} = \frac{2}{3} \cdot \frac{Q_{set,2}}{V_{pcc2,d}}$$

For simplicity, dc-link voltage control is calculating the reference $i_{Vdc,ctrl}^*$ for a first terminal connected to a first power grid only, however it could also be shared in between the first terminal and a second terminal connected to a second power grid. The power transfer set-point $P_{tr}$ can be either a quantity calculated by a slow top-level controller (secondary or tertiary control, power trading) or it can contain in addition a part calculated with a droop curve for steady-state grid support based on the frequency measurement on one terminal. Using the frequency derivative (rocof), a virtual inertia can be emulated on one terminal. More complex functions considering the grid frequencies on both terminals to determine $P_{tr}$ could also be possible.

Figure 3:
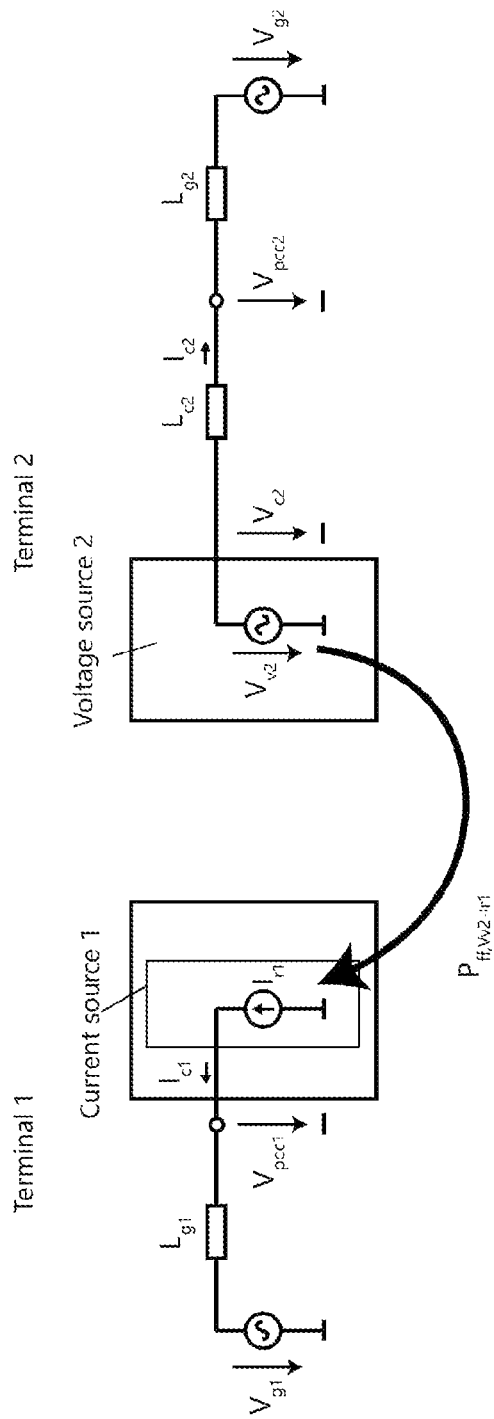
FIG. 3 shows an example of a schematic diagram of a grid intertie/HVDC link according to the prior art.

In other applications, such as connection of off-shore wind farms to the grid, a different state-of-art control method is applied. The terminal that is connected to the off-shore wind farm can be controlled in grid forming mode, i.e., a voltage source is emulated (see FIG. 3). The exchange of active and reactive power between the second terminal and the second grid is not directly controlled. Standard vector current control is applied on the first terminal which has to ensure the power balance between the first terminal and the second terminal. The set-points for the current controller of the first terminal are then given as $$I_{1d,ref} = -\frac{2}{3} \cdot \frac{P_2}{V_{pcc1,d}} + i^*_{Vdc,ctrl}$$

$$I_{1q,ref} = \frac{2}{3} \cdot \frac{Q_{set,1}}{V_{pcc1,d}}$$

$$P_2 = \frac{3}{2} \cdot (V_{pcc2,d} \cdot I_{c2,d} + V_{pcc2,q} \cdot I_{c2,q})$$

Again, the dc-link voltage is controlled with the first terminal over $i_{Vdc,ctrl}^*$.

Figure 4:
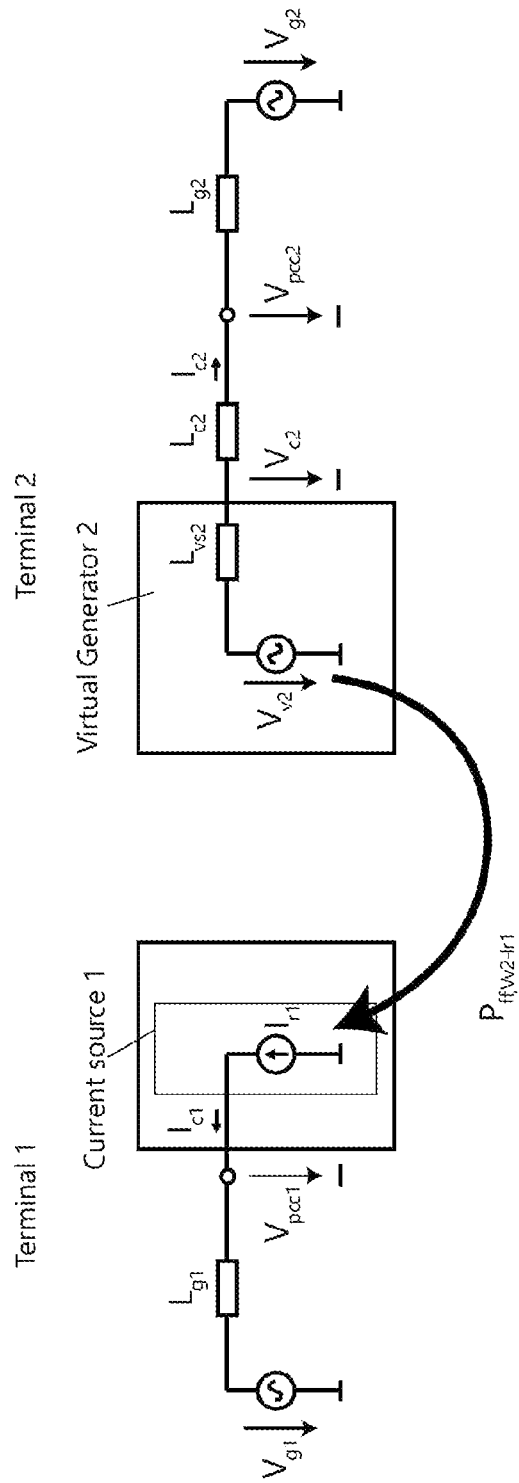
FIG. 4 shows an example of a schematic diagram of a grid intertie/HVDC link according to the prior art.

In another example according to the prior art, one terminal is equipped with virtual synchronous generator control (see FIG. 4). The other terminal is controlled with standard vector current control. The controller on the second terminal emulates the behavior of a synchronous generator. The power exchange between the second terminal and the second grid is determined by the parameters and the dynamics of the virtual synchronous generator. However, the steady-state power exchange can be influenced with a power set-point entering the droop curve that is usually implemented for virtual generators. The set-points for the current controller on the first terminal are again given as:

$$I_{1d,ref} = -\frac{2}{3} \cdot \frac{P_{VSM2}}{V_{pcc1,d}} + i^*_{Vdc,ctrl}$$

$$I_{1q,ref} = \frac{2}{3} \cdot \frac{Q_{set,1}}{V_{pcc1,d}}$$

$$P_{VSM2} = \frac{3}{2} \cdot (V_{pcc2,d} \cdot I_{c2,d} + V_{pcc2,q} \cdot I_{c2,q})$$

Again, the dc-link voltage is controlled with the first terminal. In steady-state, the active and reactive power that the virtual generator injects into the grid on the second terminal usually follow droop curves according to $$P_{2,ss} = \overbrace{P_{set,2}}^{setpoint} - \overbrace{K_g(\omega_{g2} - \omega_{set,2})}^{droop\ curve}$$

$$Q_{2,ss} = \overbrace{Q_{set,2}}^{setpoint} - \overbrace{K_q(|V_{pcc2}| - V_{set,2})}^{droop\ curve}$$

The active and reactive power set-points Pset,2 and Qset,2 are given by a slow top-level controller (secondary or tertiary control, and/or power trading).

None of the state-of-art control methods can provide full grid support on both terminals of the intertie/HVDC link without having excessive energy storage installed in the dc-link.

One of the main ideas of the present disclosure is to provide grid-supporting/grid forming control on both terminals of the HVDC link/grid intertie. This is achieved by using grid-forming vector current control (GFVCC), a control method which will be discussed in detail below, on both sides of the link, together with a bidirectional power feedforward term.

The method is not only restricted to two-port systems, but it can also be extended to multiport HVDC systems.

A unique characteristic of grid-forming vector current control is that it emulates the behavior of a virtual synchronous generator, i.e., a spinning wheel, that is connected in parallel with a current source. The spinning wheel does not consume or provide any power during steady-state, it only injects power during transients and provides inertia to the system. A current source is connected in parallel which acts as a fast governor and provides the steady-state power required by the application.

According to one aspect of the invention, this control method is duplicated and applied to control both terminals of the HVDC link/grid intertie. The power injected by the virtual generator part of the controller on the first terminal is used to create a power-equivalent current reference for the current source of the second terminal. Vice versa, the power injected by the virtual generator part of second terminal is used to create a power-equivalent current reference for the controlled current source on the first terminal. With this method, both sides of the terminal provide the characteristics of virtual generators. The required power is sourced/sinked by the grid on the opposite terminal.

The amount of grid support, i.e., the inertial response, on each terminal can be adapted easily and independently with a factor, the kvsM factor which is introduced in GFVCC from 0%-100% of the nominal power of the link. One of the advantages of this scaling is that the amount of grid support can be reduced on the strong grid side in order not to disturb the weak grid side too much.

Furthermore, the same factor, kvsM, can be used to change the system to stiff current control and reduce the virtual generator effect to zero in case of grid faults on each terminal independently.

In addition, a power flow controller can create set-points for both current sources for conventional transmission of active/reactive power over the HVDC-link/grid intertie. This power flow controller could incorporate means for power trading and/or steady-state grid support with droop curves or similar methods.

Furthermore, a dc-link voltage controller can create setpoints for the current sources on one or both terminals to control the dc-link voltage of the link.

The present disclosure relates to a grid forming vector current control system for controlling a grid intertie. The system comprises a first terminal configured to be connected to a first power grid, the first terminal comprising a first current control unit, a first virtual admittance unit, and a first phase locked loop, PLL, unit, wherein the first virtual admittance unit and the first PLL unit are configured to emulate an inertia of a first virtual synchronous machine, VSM, and a first virtual current source is connected in parallel to the first VSM. The system comprises a second terminal configured to be connected to a second power grid, the second terminal comprising a second current control unit, a second virtual admittance unit, and a second PLL unit, wherein the second virtual admittance unit and the second PLL unit are configured to emulate an inertia of a second virtual synchronous machine, VSM, and a second virtual current source is connected in parallel to the second VSM. The system comprises a controller being configured to use the transient power $P_{VSM1}$ consumed by the first VSM to generate a power-equivalent current reference to control the second virtual current source and to use the transient power $P_{VSM2}$ consumed by the second VSM to generate a power-equivalent current reference to control the first virtual current source.

Various embodiments may preferably implement the following features.

Preferably, the first terminal comprises a first droop control unit and an output signal of the first droop control unit is connected to the first virtual current source in order to emulate a first speed governor.

Preferably, the second terminal comprises a second droop control unit and an output signal of the second droop control unit is connected to the second virtual current source in order to emulate a second speed governor.

Preferably, the first terminal comprises a first droop control unit and an output signal of the first droop control unit is connected to the first PLL unit in order to emulate a first virtual mechanical speed governor.

Preferably, the second terminal comprises a second droop control unit and an output signal of the second droop control unit is connected to the second PLL unit in order to emulate a second virtual mechanical speed governor.

Preferably, a first factor $k_{VSM1}$ is configured to change the characteristics of the first terminal continuously from voltage source to current source by proportionally scaling the output signals of the first virtual admittance with $k_{VSM1}$.

Preferably, a second factor $k_{VSM2}$ is configured to change the characteristics of the second terminal continuously from voltage source to current source by proportionally scaling the output signals of the second virtual admittance with $k_{VSM2}$.

Preferably, at least one of the first droop control unit, the first virtual admittance unit or the first PLL unit is configured to receive the factor $k_{VSM1}$ in order to increase or decrease the inertial response of the first terminal to disturbances in the first grid.

Preferably, at least one of the second droop control unit, the second virtual admittance unit or the second PLL unit is configured to receive the factor $k_{VSM2}$ in order to increase or decrease the inertial response of the second terminal to disturbances in the second grid.

Preferably, $k_{VSM1}$ scales a nominal power of the first VSM by proportionally scaling the output signals of the first virtual admittance with $k_{VSM1}$, inversely proportionally scaling the proportional gain of the first PLL unit with $k_{VSM1}$, and/or proportionally scaling a first droop constant with $k_{VSM1}$.

Preferably, $k_{VSM2}$ scales a nominal power of the second VSM by proportionally scaling the output signals of the second virtual admittance with $k_{VSM2}$, inversely proportionally scaling the proportional gain of the second PLL unit with $k_{VSM2}$, and/or proportionally scaling a second droop constant with $k_{VSM2}$.

Preferably, $k_{VSM1}$ scales at least one of a spinning wheel factor or a transient power or the inertia.

Preferably, $k_{VSM2}$ scales at least one of a spinning wheel factor or a transient power or the inertia.

Preferably, the system further comprises a third terminal configured to be connected to a third power grid, the third terminal comprising a third droop control unit, a third current control unit, a third virtual admittance unit, and a third PLL unit, wherein the third virtual admittance unit and the third PLL unit are configured to emulate an inertia of a third virtual synchronous machine, VSM, and a third virtual current source is connected in parallel to the third VSM. Preferably, the controller is configured to use the transient power $P_{VSM1}$ consumed by the first VSM and the transient power $P_{VSM2}$ consumed by the second VSM to generate a power-equivalent current reference to control the third virtual current source, the transient power $P_{VSM1}$ consumed by the first VSM and the transient power $P_{VSM3}$ consumed by the third VSM to generate a power-equivalent current reference to control the second virtual current source, and the transient power $P_{VSM2}$ consumed by the second VSM and the transient power $P_{VSM3}$ consumed by the third VSM to generate a power-equivalent current reference to control the first virtual current source.

The present disclosure also relates to a grid forming vector current control method for controlling a grid intertie.

The method comprises providing a first terminal configured to be connected to a first power grid, the first terminal comprising a first current control unit, a first virtual admittance unit, and a first phase locked loop, PLL, unit; emulating, with the first virtual admittance unit and the first PLL unit, an inertia of a first virtual synchronous machine, VSM; providing a first virtual current source connected in parallel to the first VSM. The method also comprises providing a second terminal configured to be connected to a second power grid, the second terminal comprising a second current control unit, a second virtual admittance unit, and a second PLL unit; emulating, with the second virtual admittance unit and the second PLL unit, an inertia of a second virtual synchronous machine, VSM; providing a second virtual current source connected in parallel to the second VSM. The method also comprises using the transient power $P_{VSM1}$ consumed by the first VSM to generate a power-equivalent current reference to control the second virtual current source and using the transient power $P_{VSM2}$ consumed by the second VSM to generate a power-equivalent current reference to control the first virtual current source.

Various embodiments may preferably implement the following features.

Preferably, the first terminal comprises a first droop control unit and the method comprises connecting an output signal of the first droop control unit to the first virtual current source in order to emulate a first speed governor.

Preferably, the second terminal comprises a second droop control unit and the method comprises connecting an output signal of the second droop control unit to the second virtual current source in order to emulate a second speed governor.

Preferably, the first terminal comprises a first droop control unit and the method comprises connecting an output signal of the first droop control unit to the first PLL unit in order to emulate a first virtual mechanical speed governor.

Preferably, the second terminal comprises a second droop control unit and the method comprises connecting an output signal of the second droop control unit to the second PLL unit in order to emulate a second virtual mechanical speed governor.

Preferably, the method comprises applying a first factor $k_{VSM1}$ to change the characteristics of the first terminal continuously from voltage source to current source by proportionally scaling the output signals of the first virtual admittance with $k_{VSM1}$.

Preferably, the method comprises applying a second factor $k_{VSM2}$ to change the characteristics of the second terminal continuously from voltage source to current source by proportionally scaling the output signals of the second virtual admittance with $k_{VSM2}$.

Preferably, the method comprises feeding the factor $k_{VSM1}$ into at least one of the first droop control unit, the first virtual admittance unit or the first PLL unit in order to increase or decrease the inertial response of the first terminal to disturbances in the first grid.

Preferably, the method comprises feeding the factor $k_{VSM2}$ into at least one of the second droop control unit, the second virtual admittance unit or the second PLL unit in order to increase or decrease the inertial response of the second terminal to disturbances in the second grid.

Preferably, the method comprises scaling, with the factor $k_{VSM1}$, a nominal power of the first VSM by proportionally scaling the output signals of the first virtual admittance with $k_{VSM1}$, inversely proportionally scaling the proportional gain of the first PLL unit with $k_{VSM1}$, and/or proportionally scaling a first droop constant with $k_{VSM1}$.

Preferably, the method comprises scaling, with the factor $k_{VSM2}$, a nominal power of the second VSM by proportionally scaling the output signals of the second virtual admittance with $k_{VSM2}$, inversely proportionally scaling the proportional gain of the second PLL unit with $k_{VSM2}$, and/or proportionally scaling a second droop constant with $k_{VSM2}$.

Preferably, the method comprises scaling, with the factor $k_{VSM1}$, at least one of a spinning wheel factor or a transient power or the inertia.

Preferably, the method comprises scaling, with the factor $k_{VSM2}$, at least one of a spinning wheel factor or a transient power or the inertia.

Preferably, the method comprises providing a third terminal configured to be connected to a third power grid, the third terminal comprising a third current control unit, a third virtual admittance unit, and a third PLL unit; emulating, with the third virtual admittance unit and the third PLL unit, an inertia of a third virtual synchronous machine, VSM; providing a third virtual current source connected in parallel to the third VSM.

Preferably, the method comprises using the transient power $P_{VSM1}$ consumed by the first VSM and the transient power $P_{VSM2}$ consumed by the second VSM to generate a power-equivalent current reference to control the third virtual current source.

Preferably, the method comprises using the transient power PVSM1 consumed by the first VSM and the transient power PVSM3 consumed by the third VSM to generate a power-equivalent current reference to control the second virtual current source.

Preferably, the method comprises using the transient power PVSM2 consumed by the second VSM and the transient power PVSM3 consumed by the third VSM to generate a power-equivalent current reference to control the first virtual current source.

The proposed methods and systems of the present disclosure have, among others, the following advantageous effects:

characteristics of virtual synchronous generators on both terminals of the link can be provided without the requirement for excessive energy storage in a dc-link;

the amount of grid support on each terminal can be adapted easily with a single factor;

smooth and fluent changeover from voltage source characteristics to current source characteristics can be provided without changing the control mode;

smooth transition in and out of operation with maximum current can be provided without losing synchronism;

improved fault handling capability;

improved performance in weak and in strong grids (Because the active power setpoint tracking and governor control are conceptually implemented with the fast current control loop, there is no performance degradation in strong grids which can be often observed when using VSM control);

the used grid-forming vector current control supports grid connected operation as well as stand-alone grid forming/islanding operation without any control mode or parameter change;

explicit current control and current limitation;

providing of explicit PLL for synchronization with the grid before closing MCB and for preventing loss of synchronism during faults;

PLL together with the virtual admittance acts as a virtual swing equation, obviating synchronization using power balance;

simplicity and reduced commissioning effort (Using grid forming vector current control reduces the amount of required tuning parameters considerably compared to a conventional implementation with virtual synchronous generator control on one terminal).

Various exemplary embodiments of the present disclosure are described in detail below with reference to the following figures. The drawings are provided for purposes of illustration only and merely depict exemplary embodiments of the present disclosure to facilitate the reader's understanding of the present disclosure.

Therefore, the drawings should not be considered limiting of the breadth, scope, or applicability of the present disclosure.

Figures 5A, 5B:
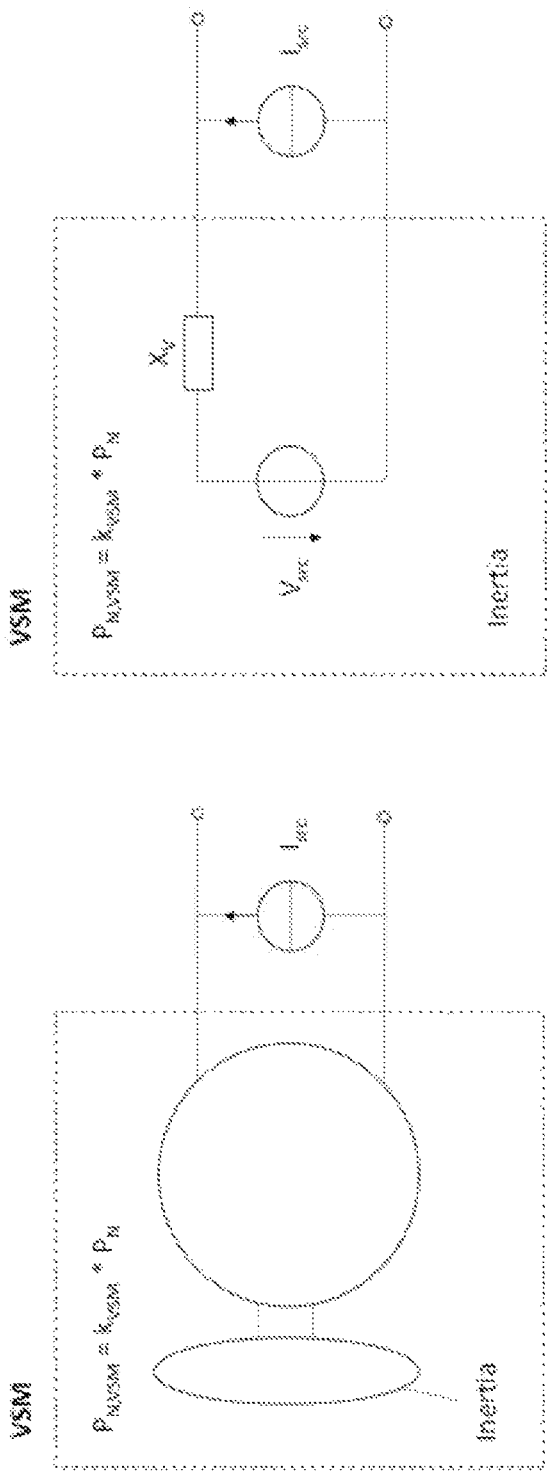
FIGS. 5A and 5B show schematic diagrams according to the present disclosure.

FIGS. 5A and 5B schematically depict the grid forming vector current control (GFVCC) system according to the present disclosure. In particular, FIG. 5A shows a virtual synchronous machine (VSM) with a current source connected in parallel, while FIG. 5B shows the equivalent circuit diagram thereof. The system emulates the combined effect of a virtual machine, whose nominal power and amount of grid support can be scaled independently and online with a single input/parameter and a parallel connected current source. Thus, the system may be controlled remotely. For certain aspects, e.g., fault handling, it may be preferable to change the nominal power and amount of grid support within the application code.

Figure 6A:
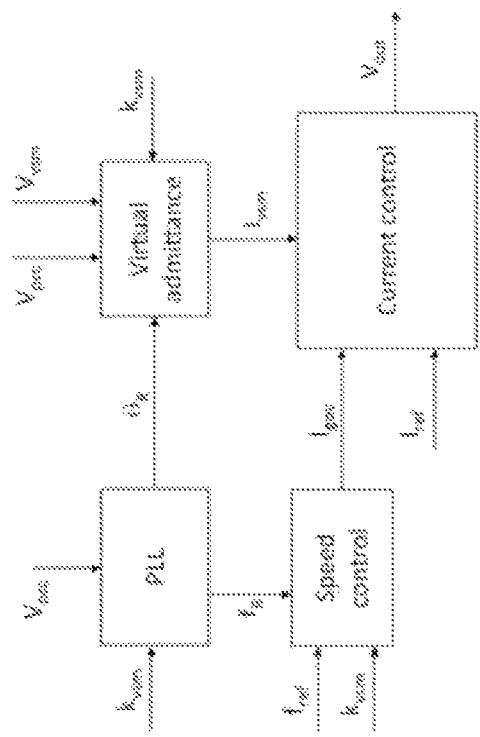
FIGS. 6A and 6B show schematic block diagrams according to the present disclosure.
Figure 6B:
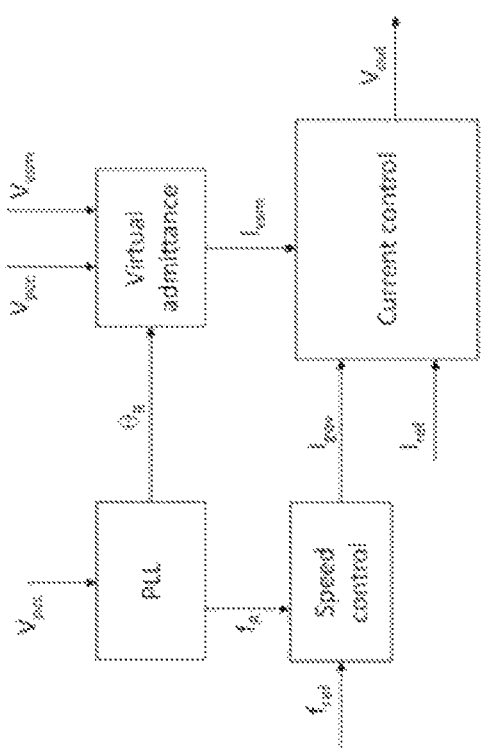

In more detail, the disclosed GFVCC system according to an exemplary embodiment uses control blocks as shown in FIGS. 6A and 6B to emulate the proposed behavior. The calculation thereof will be discussed below. FIG. 6A comprises a phase locked loop (PLL) block fed by a voltage at a point of common coupling (PCC) $V_{pcc}$ as well as a speed control block having a reference frequency $f_{ref}$ as an input. The output of the PLL is provided to a virtual admittance block together with $V_{pcc}$ and a voltage of the virtual synchronous machine $V_{vsm}$. The speed control output, the virtual admittance output as well as a reference current $I_{ref}$ are then processed in a current control block which outputs a voltage $V_{out}$.

FIG. 6B additionally comprises the parameter kVSM as an input to at least one of the PLL, speed control and current control blocks. Thereby, an amount of grid support of a main grid may be controlled. kVSM may also be used to smoothly change the characteristics of the control scheme from voltage source to current source, also supporting a mix of both characteristics. A smooth changeover to stiff current control can be beneficial during grid faults to keep synchronism with the grid. The control mode does not have to be changed.

The GFVCC system may also comprise an active voltage regulator (AVR). The GFVCC system according to the exemplary embodiment emulates the combined effects of virtual inertia, damper winding, virtual stator impedance, AVR and droop governor. Virtual inertia and damper winding are emulated using the standard PLL block.

Opposite to conventional virtual machine implementations, the active power setpoint tracking and the droop governor are conceptually implemented with a fast current source. Therefore, there is no performance degradation in strong grids which can be often observed when using VSM control. Thus, a good performance in weak and in strong grids is achieved. The method supports unplanned islanding and islanded operation.

The complexity of the control scheme and the related commissioning effort is very low. Due to the removal of a cascaded voltage control loop and by reusing the PLL to emulate inertia and damping, the number of parameters can be reduced from more than fifteen in conventional approaches to only seven parameters with clear meaning and less interactions. Therefore, the system may also be tuned more easily.

[ono] Further advantages of the proposed concept are the possibility to configure the amount of grid support with a single parameter to simplify offering of grid supporting features in applications with low energy storage such as UPS in data centers, PV with low or no storage, EV charging with buffer battery, insensitive loads etc. as well as a smooth transition in and out of operation with maximum current without losing synchronism, thus improving the fault handling capability.

The GFVCC system provides an explicit current control and current limitation and an explicit PLL for synchronization with the grid before closing an MCB and for preventing loss of synchronism during faults. The PLL together with the virtual admittance acts as a virtual swing equation, obviating synchronization using power balance.

FIGS. 7 to 11 show a more detailed overview of the proposed grid supporting control scheme and respective equivalent circuits.

Figure 7:
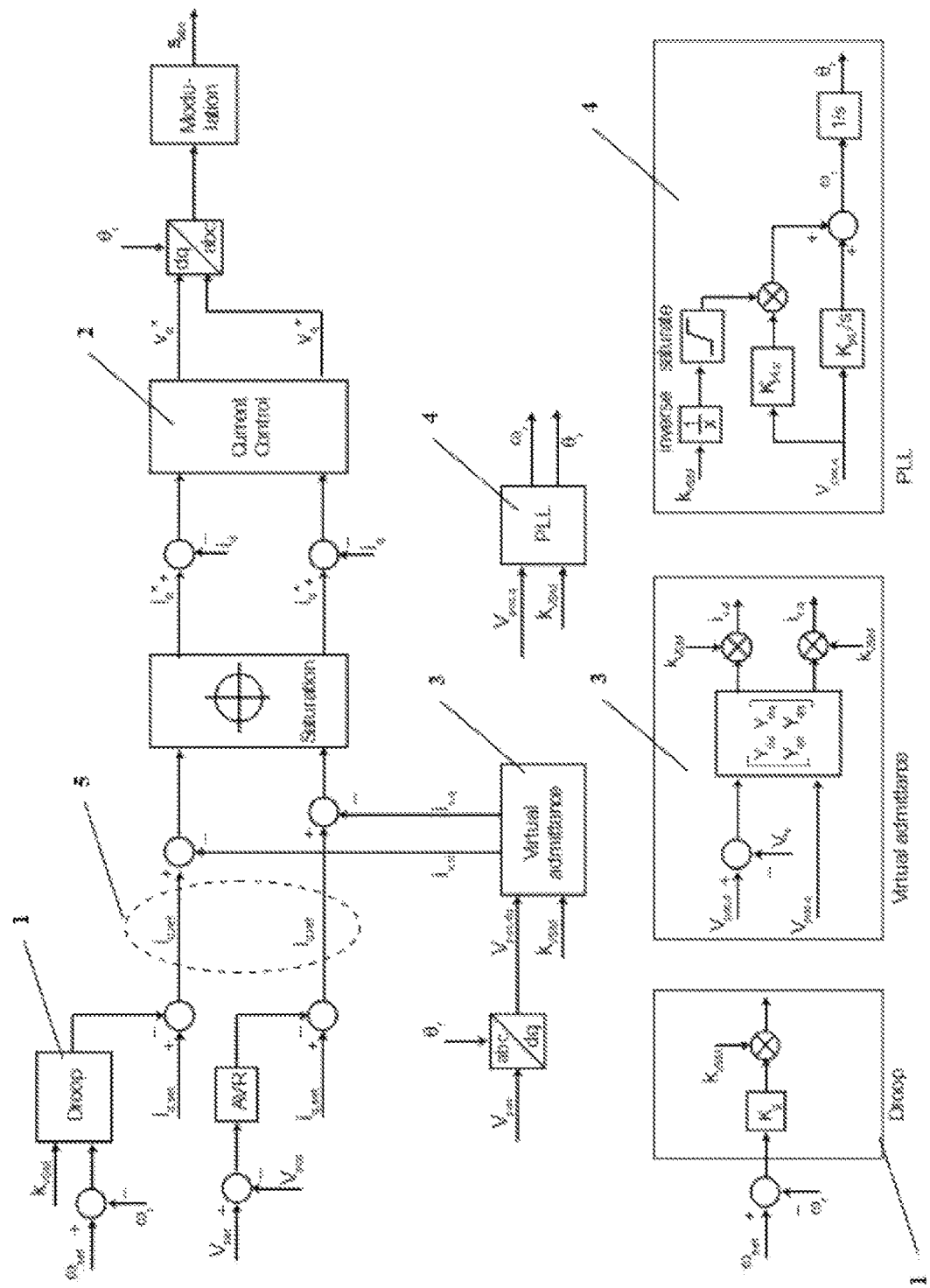
FIG. 7 shows the basic structure of the grid forming vector current control according to the present disclosure.

The control scheme of FIG. 7 is conceptually depicted in FIGS. 5A and 5B. The control scheme of FIG. 5A can be separated into two functional parts being a VSM without any governor, i.e. a spinning wheel or inertia, respectively, as shown by the dotted line and a current source connected in parallel at the terminals of the virtual synchronous machine. The behavior of the virtual synchronous machine is emulated with the PLL. The current source is working in parallel. It acts simultaneously as a fast power setpoint tracker and as a governor, because it ensures steady-state power balance between the grid and the spinning wheel. The inertial response with respect to the active power is ensured by the virtual admittance. In the steady state, the complete power flowing to the grid is injected by the current source. The spinning wheel injects power only during transients.

FIG. 7 shows a GVCC system according to an embodiment having a droop control unit 1, a current control unit 2, a virtual admittance unit 3 and a phase locked loop (PLL) unit 4. The virtual admittance unit 3 and the PLL unit 4 are configured to emulate an inertia of the VSM and a virtual current source 5 is connected in parallel to the VSM. In this embodiment, an output signal of the droop control unit 1 is connected to the virtual current source 5 in order to emulate a speed governor.

The GVCC system according to a preferred embodiment will now be described in more detail. The simplest form of traditional state-of-the-art implementations of a virtual synchronous machine are based on the swing equation. The goal of virtual synchronous machine control is to make the behavior of the converter at the point of common coupling (PCC) equal to the behavior of a synchronous machine.

Figure 8A:
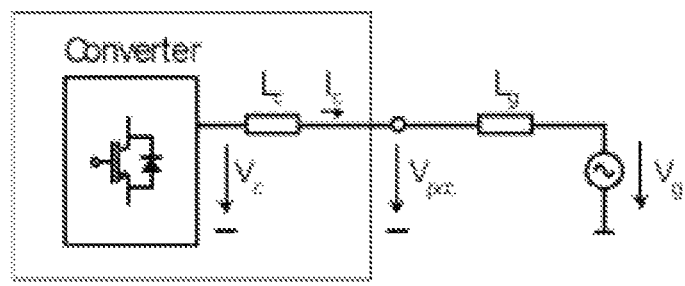
FIG. 8A to 8C show virtual machine variants according to the present disclosure.
Figure 8B:
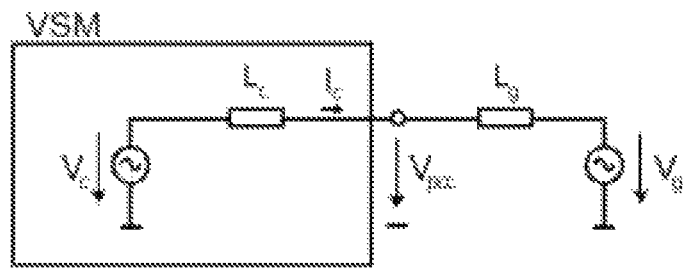
Figure 8C:
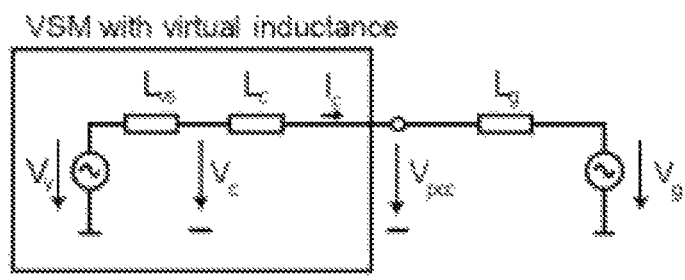

FIG. 8A to 8C are equivalent circuits of respective components, i.e. state-of-the-art virtual machine variants. In particular, FIG. 8A shows a converter, FIG. 8B a VSM without virtual inductance and FIG. 8C a VSM with virtual inductance.

The following derivations are based on a converter with an inductive output filter for simplicity reasons. However, the control method proposed herein is suitable for converters with any type of output filter structure, such as L, LC or LCL.

The swing equation couples the change of frequency of the voltage source VC with the active power flowing out or into the machine. In the case of a VSM without virtual inductance, the converter voltage VC is equal to the back electromotive force (back-emf) of the virtual machine. The converter filter inductance LC is equal to the stator inductance of the virtual machine and the PCC voltage Vpcc is equal to the stator voltage of the virtual machine. The converter voltage VC (virtual back-emf) has the rotational frequency ωr to highlight its equivalency with the virtual rotor frequency. The PCC voltage (virtual stator voltage) has the rotational frequency $\omega_{pcc}$. The swing equation looks as follows:

$$M \cdot \frac{d\omega_r}{dt} = -P_{out} + \overbrace{P_{set}}^{setpoint} - \overbrace{\frac{1}{K_g}(\omega_r - \omega_{set})}^{governor} - \overbrace{\frac{1}{K_f}(\omega_r - \omega_{pcc})}^{damper\ winding} \quad (1)$$

$$\frac{d\theta_r}{dt} = \omega_r \quad (2)$$

In quasi steady-state, the power flow is given by the angle difference between the virtual back-emf VC and the PCC voltage $V_{pcc}$ across the converter filter reactance $X_C = \omega N * L_C$.

$$P_{out} = \frac{V_c V_{pcc}}{X_c} \sin(\theta_r - \theta_{pcc}) \quad (3)$$

There is a direct dependency of the power flow, the reactances and the angle differences across parts of the transmission line, i.e.

$$P_{out} = \frac{V_c V_{pcc}}{X_c} \sin(\theta_r - \theta_{pcc}) = \frac{V_{pcc} V_g}{X_g} \sin(\theta_{pcc} - \theta_g) = \frac{V_c V_g}{X_c + X_g} \sin(\theta_r - \theta_g) \quad (4)$$

The swing equation thus becomes $$\frac{d\omega_r}{dt} = \quad (5)$$
$$-\frac{V_c V_{pcc}}{MX_c}\sin(\theta_r - \theta_{pcc}) + \frac{1}{M}\overbrace{P_{set}}^{setpoint} - \frac{1}{M}\overbrace{K_g(\omega_r - \omega_{set})}^{governor} - \frac{1}{M}\overbrace{K_f(\omega_r - \omega_{pcc})}^{damper\ winding}$$

$$\frac{d\theta_r}{dt} = \omega_r$$

In a second step, state-of-art VSM implementations have introduced a virtual reactance $X_{vs}=\omega_N*L_{vs}$ according to FIG. 8C. The virtual reactance changes the equations slightly. The converter voltage VC in phasor notation is calculated according to $$V_C = V_v - jX_{vs} \cdot I_c \quad (6)$$

The virtual back-emf of the machine is designated as $V_v$ (with rotational frequency $\omega_r$ and angle $\theta_r$) and has moved behind the virtual reactance $X_{vs}$. Regarding the behavior at the PCC, the virtual machine has now a total virtual stator reactance of $X_v=X_c+X_{vs}$ and the power flow equation changes to $$P_{out} = \frac{V_v V_{pcc}}{X_{vs} + X_c}\sin(\theta_r - \theta_{pcc}) = \frac{V_v V_{pcc}}{X_v}\sin(\theta_r - \theta_{pcc}) \quad (7)$$

and the swing equation becomes $$\frac{d\omega_r}{dt} = -\frac{V_v V_{pcc}}{MX_v}\sin(\theta_r - \theta_{pcc}) + \quad (8)$$
$$\frac{1}{M}\overbrace{P_{set}}^{setpoint} - \frac{1}{M}\overbrace{K_g(\omega_r - \omega_{set})}^{governor} - \frac{1}{M}\overbrace{K_f(\omega_r - \omega_{pcc})}^{damper\ winding}$$

It should be noted that the virtual inductance $L_{vs}$ is in series to the converter filter inductance LC and therefore adds to the total virtual stator inductance of the virtual machine seen from the PCC.

Figure 9A:
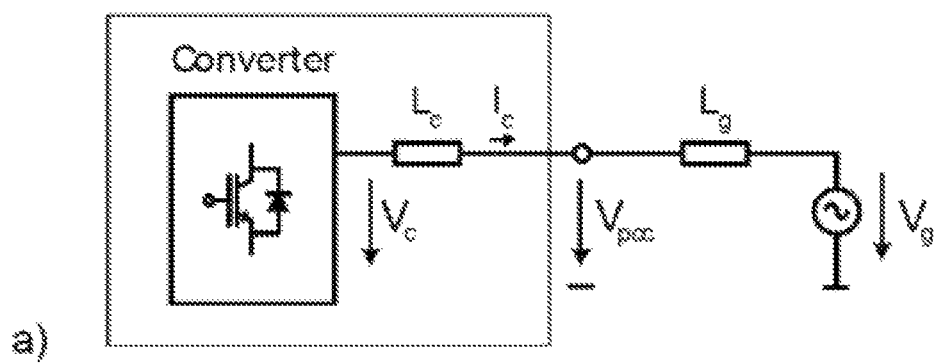
FIGS. 9A and 9B show equivalent models of the proposed control scheme according to the present disclosure.
Figure 9B:
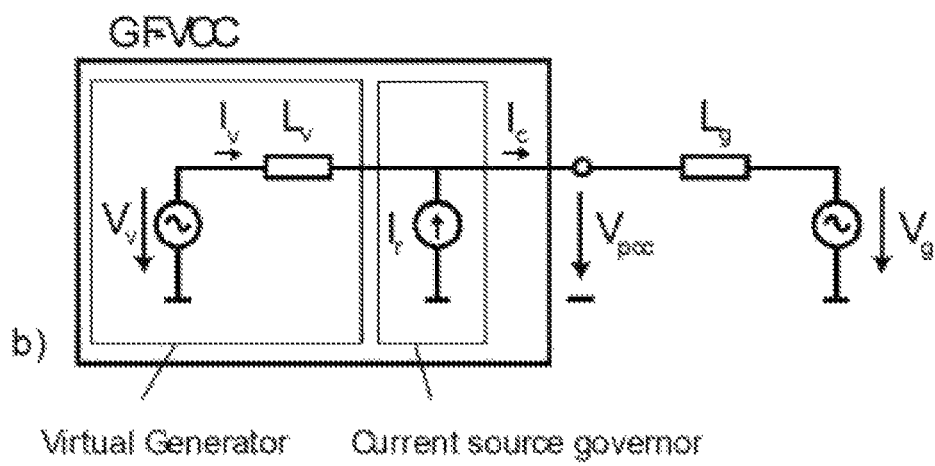

FIGS. 9a and 9b show an equivalent model of a control scheme according to an exemplary embodiment. Therein, the swing equation is not directly implemented as in traditional approaches. Moreover, the effect of the PLL together with the virtual admittance is compared to the swing equation. The angle θr is no longer computed by the swing equation, but it is the output of the PLL according to the equations:

$$\omega_r = \left(K_{pll,p} + \frac{K_{pll,i}}{s}\right) \cdot V_{pcc,q} = -\left(K_{pllp} + \frac{K_{plli}}{s}\right) \cdot V_{pcc} \cdot \sin(\theta_r - \theta_{pcc}) \quad (9)$$

$$\frac{d\theta_r}{dt} = \omega_r$$

Calculating the derivative of equation (9) yields:

$$\frac{d\omega_r}{dt} = -(s \cdot K_{pll,p} + K_{pll,i}) \cdot V_{pcc} \cdot \sin(\theta_r - \theta_{pcc}) \quad (10)$$

$$\frac{d\theta_r}{dt} = \omega_r$$

For small angle differences (which is the case for reasonable PLL tuning), the sine function can be approximated as $\sin(\theta_r-\theta_{pcc})\approx(\theta_r-\theta_{pcc})$ and the derivative thereof becomes $s\cdot\sin(\theta_r-\theta_{pcc})\approx\omega_r-\omega_{pcc}$.

The equation set may thus also be formulated as follows:

$$\frac{d\omega_r}{dt} = -K_{pll,i} \cdot V_{pcc} \cdot \sin(\theta_r - \theta_{pcc}) \cdot K_{pll,p} \cdot V_{pcc} \cdot (\omega_r - \omega_{pcc}) \quad (11)$$

$$\frac{d\theta_r}{dt} = \omega_r$$

By comparing equation (11) with the original swing equation (1), the PLL gains for formal equivalence of the two equations may be $$K_{pll,p} = \frac{K_f}{MV_{pcc}}, \quad K_{pll,i} = \frac{V_v}{MX_v} \quad (12)$$

The governor power will be replaced with the parallel current source in a later step below. The proportional gain of the PLL therefore emulates the damper winding effect and the integral gain couples the angle difference with an increase/decrease of frequency, emulating the self-synchronization principle of synchronous machines.

Opposite to the swing equation, the PLL does not implicitly couple power flow with the angle difference, because it describes only the evolution of the internal PLL angle $\theta_r$.

Coupling of power flow and angle difference has to be ensured explicitly with an additional current reference for the current controller. The reference is created with a virtual admittance being equivalent to the inverse of the virtual stator impedance, i.e.

$$Y_v(s) = Z_v(s)^{-1} \quad (13)$$

The stator impedance is assumed to be of RL-type. If the admittance is implemented in dq-reference frame it can be described as follows $$Z_v = \begin{bmatrix} R_v + s \cdot L_v & -\omega_N \cdot L_v \\ \omega_N \cdot L_v & R_v + s \cdot L_v \end{bmatrix}, \quad (14)$$

$$Y_v = \begin{bmatrix} \dfrac{R_v + s \cdot L_v}{R_v^2 + 2L_v R_v s + L_v^2(s^2 + \omega_N^2)} & \dfrac{\omega_N L_v}{R_v^2 + 2L_v R_v s + L_v^2(s^2 + \omega_N^2)} \\ \dfrac{-\omega_N L_v}{R_v^2 + 2L_v R_v s + L_v^2(s^2 + \omega_N^2)} & \dfrac{R_v + s \cdot L_v}{R_v^2 + 2L_v R_v s + L_v^2(s^2 + \omega_N^2)} \end{bmatrix} \quad (15)$$

Figure 10:
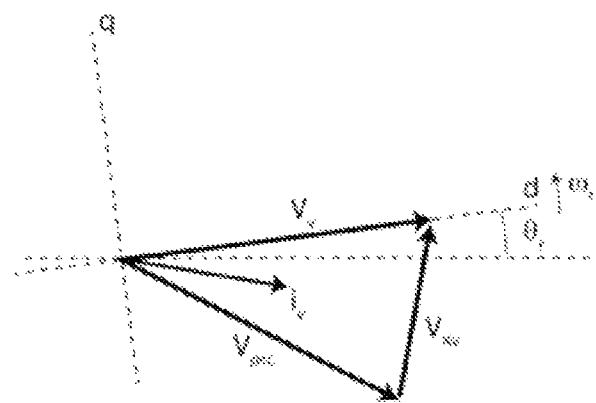
FIG. 10 depicts a vector diagram for a transient situation according to the present disclosure.

The current references $i_{v,dq}$ are created according to the matrix multiplication of the virtual admittance with the voltage difference between a virtual back-emf voltage $V_v$ aligned to the d-direction of the PLL reference frame ($V_v = V_N + j*0$) and the PCC voltage $V_{pcc}$ (this is shown in FIG. 10 depicting a vector diagram for a transient situation).

$$i_{v,d} = Y_{v,dd}(s) \cdot (V_{pcc,d} - V_N) + Y_{v,dq} \cdot V_{pcc,q}$$

$$i_{v,q} = Y_{v,qd}(s) \cdot (V_{pcc,d} - V_N) + Y_{v,qq} \cdot V_{pcc,q} \quad (16), (17)$$

Alternatively, it is also possible to work with complex numbers and implement the admittance according to $$i_{v,d} + j \cdot i_{v,q} = \dfrac{1}{(R + s \cdot L_v + j \cdot \omega_N L_v)} \cdot ((V_{pcc,d} + j \cdot V_{pcc,q}) - (V_N + j \cdot 0)) \quad (18)$$

In the steady state and assuming that $R_v \ll \omega_N * L_v$, the admittance simplifies to $$Y_v \approx \begin{bmatrix} 0 & \dfrac{1}{\omega_N L_v} \\ -\dfrac{1}{\omega_N L_v} & 0 \end{bmatrix} \quad (19)$$

and thus leads to the following steady-state current references:

$$i_{v,d} = \dfrac{1}{\omega_N L_v} \cdot V_{pcc,q} \quad (20)$$

$$i_{v,q} = -\dfrac{1}{\omega_N L_v} \cdot (V_{pcc,d} - V_N) \quad (21)$$

If the PCC voltage $V_{pcc}$ is equal to the nominal voltage $V_N$, the injected q-axis current can be neglected. Thus, a coupling between q-voltage and active current in d-direction over the virtual stator reactance ($X_v = \omega_N * L_v$) may be described as $$i_{v,d} = \dfrac{1}{X_v} \cdot V_{pcc,q} = -\dfrac{V_{pcc}}{X_v} \sin(\theta_r - \theta_{pcc}) \quad (22)$$

wherein the related power flow (assuming fast current tracking) is $$P_{out} = V_v i_{v,d} = -\dfrac{V_v V_{pcc}}{X_v} \sin(\theta_r - \theta_{pcc}) \quad (23)$$

Therefore, according to the present disclosure, an equivalence between the quasi steady-state power flow governed by the swing equation and the power flow created by the PLL+virtual admittance combination is ensured.

The virtual admittance may be implemented with the full dynamic model to ensure passivity and damping of high frequency resonances. However, simplified admittance models (neglecting s*L terms) are also possible as are more complex models which permit additional filtering functions. Even asymmetric admittance is possible. The minimal requirement is to implement coupling between q-voltage and active current.

It has been shown that the combination of special settings for the PLL gains and a virtual admittance allows emulating the effect of inertia, damper winding and stator impedance of a virtual synchronous machine with the conventional control structure used for vector current control.

In the following, the droop block is further described. Different to the original VSM implementation, the proposed control method just implements a spinning wheel without a governor for the mechanical input power. Therefore, the injected power from the spinning wheel will be zero in steady-state ($i_{v,d}=0$) and the angle $\theta_r$ aligns with $\theta_{pcc}$.

The governor power is replaced by a current source ensuring the steady-state power balance. In addition to the reference coming from the virtual admittance, an active current reference is created according to $$i_{d,ref} = \dfrac{P_{set} + K_g \cdot (\omega_r - \omega_{set})}{V_{pcc,d}} = \dfrac{P_{set} + K_g \cdot (\omega_r - \omega_{set})}{V_{pcc} \cdot \cos(\theta_r - \theta_{pcc})} \quad (24)$$

which leads to an injected power of $$P = V_{pcc,d} i_{d,ref} = V_{pcc} \cos(\theta_r - \theta_{pcc}) \cdot i_{d,ref} = P_{set} + K_g \cdot (\omega_r - \omega_{set})$$

The main difference is that this current reference is directly fed to the current controller, there is no filtering over the swing equation taking place. Set-point changes feed through directly and are followed much faster compared to conventional VSM implementations.

For reasonable loading conditions and reasonable virtual stator reactance of the spinning wheel, the angle difference $\theta_r - \theta_{pcc}$ is small and $\cos(\theta_r - \theta_{pcc})$ is close to unity. In that case, the division by $V_{pcc,d}$ can be replaced with a division by constant $V_N$.

Furthermore, an active voltage regulator (AVR) may be added to keep the magnitude of the PCC voltage constant. The AVR block could be of PI, or integrator (I) type, or proportional type (P) only. It creates a q-current reference $i_{qref}$ which is used to regulate the voltage magnitude.

$$i_{qref} = G_{avr}(s) \cdot (|V_{pcc}| - V_N) \quad (26)$$

However, the AVR block can also be omitted since the virtual admittance already implements a proportional gain AVR effect with $$i_{v,q} = -\dfrac{1}{\omega_1 L_v} \cdot (V_{pcc,d} - V_N) \quad (27)$$

As has been indicated above, a factor kvsM may be used to adjust or scale the amount of grid support. Preferably, the factor kvsM is continuous and ranges from 0 to 1. With this factor it is possible to scale the nominal power of the virtual machine that can be thought to operate in parallel to the current source with a single factor. The connections and inputs of kvsM are shown in FIG. 6b. The equations (28), (29), (30), (31) and (32), respectively, are as follows:

$$Y_{virt} = k_{VSM} \cdot Y_{virt,N}$$

$$M = k_{VSM} \cdot M_N$$

$$K_g = k_{VSM} \cdot K_{g,N}$$

$$K_{pll,i} = \frac{3}{2} \cdot \frac{V_N}{k_{VSM} \cdot M_N \cdot \frac{1}{k_{VSM} \cdot Y_{virt,N}}} = \frac{3}{2} \cdot \frac{V_N}{M_N \cdot Z_{virt,N}} = K_{pll,i,N}$$

$$K_{pll,p} = K_f \cdot \frac{1}{k_{VSM} \cdot M_N \frac{3}{2} V_N} = \frac{1}{k_{VSM}} \cdot K_{pll,p,N}$$

Figure 11:
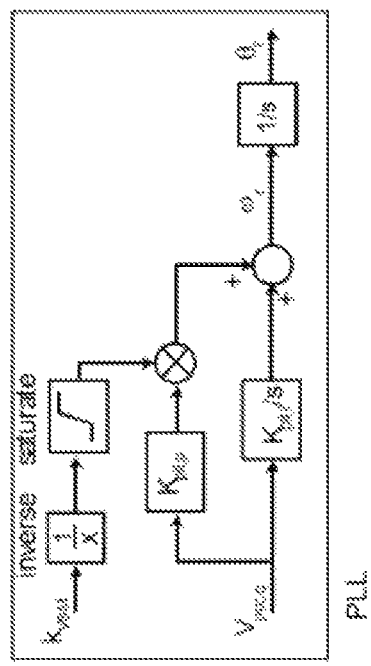
FIG. 11 is a block diagram showing the usage of a factor kVSM to adjust an amount of grid support according to the present disclosure.
Figure 11:
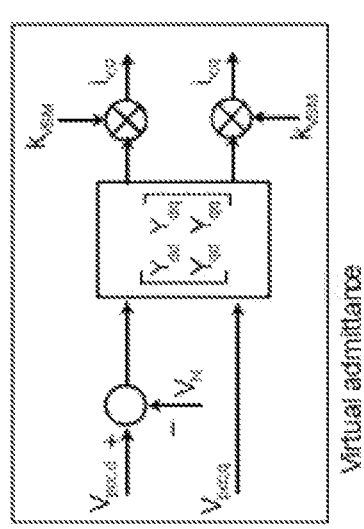
Figure 11:
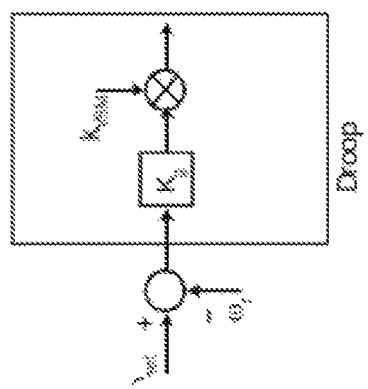

With reference to FIG. 7, the modified block diagrams of the droop block, the virtual admittance block and the PLL block are shown in FIG. 11.

It is important to saturate the inverse of kvsM used in the PLL block to a maximum value to keep the PLL loop stable. A too high proportional gain of the PLL loop can lead to instability, a well-known effect of standard vector current control with PLL.

It should be noted that adjusting the amount of grid support by scaling the nominal power of the VSM is a unique feature of the control structure of GVCC. The nominal power of the parallel current source is not affected, and the control structure can therefore continue to operate with conventional current control and with maximum power capability, even if kvsM is set to zero.

This feature may not be realized with conventional VSM implementations. With a standard VSM, the power transfer capability is linked to the nominal power of the VSM. The power flow is controlled by advancing the angle of the virtual back-emf in VSM and the voltage difference is applied over the virtual stator reactance. Reducing the nominal power of the VSM leads to an increase of the reactance and consequently, an increased angle difference is required to transfer the same amount of power. Because the maximum angle difference is limited to 90°, the power transfer capability reduces with the nominal power of the VSM. Consequently, the nominal power of the VSM cannot be independently adjusted in conventional control approaches. Other applications than the ones disclosed herein may also be feasible.

Figure 12:
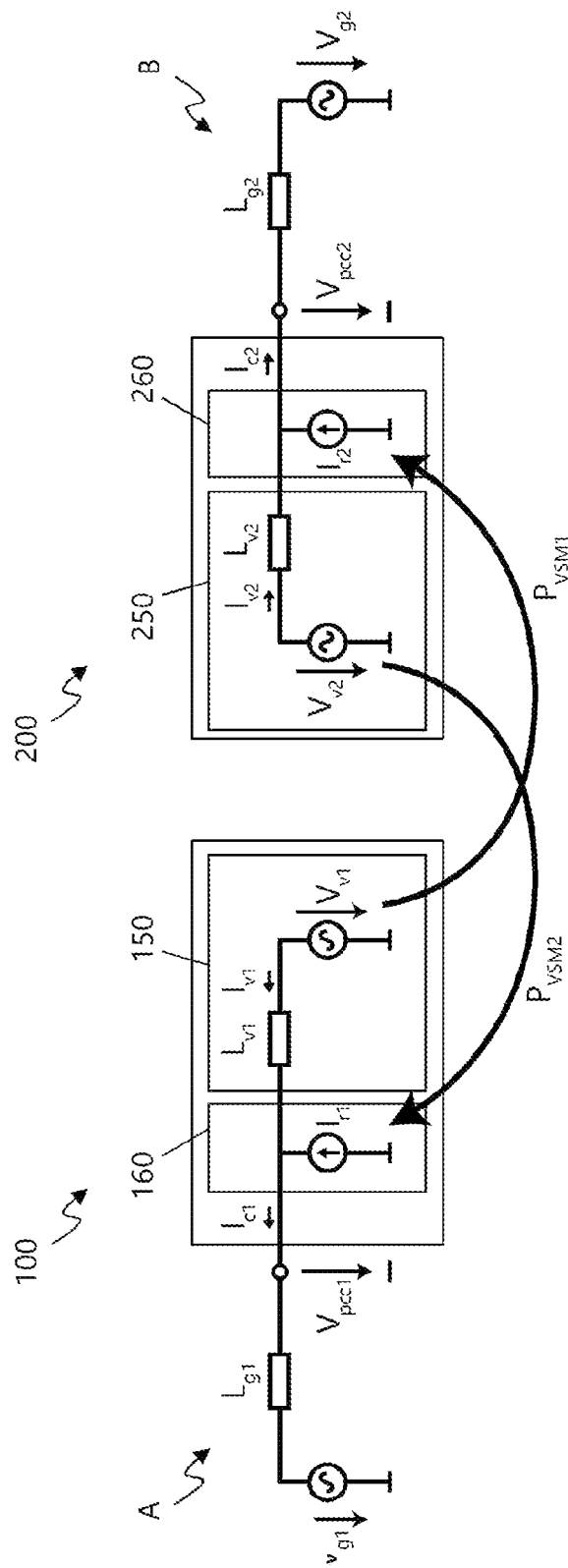
FIG. 12 shows a schematic diagram of a grid forming vector current control system for controlling a grid intertie according to the present disclosure.

FIG. 12 shows a schematic block diagram of a grid forming vector current control system for controlling a grid intertie. According to the present disclosure, both terminals, the first terminal 100 connected to the first power grid A and the second terminal 200 connected to the second power grid B are controlled using the GFVCC as described above. As discussed in detail above, this control scheme emulates a virtual generator, i.e. a virtual synchronous machine (VSM) 150/250 that is connected in parallel with a (virtual) current source 160/260.

The VSM part emulates the inertial response and the low output impedance of a synchronous generator. However it does not contribute to steady-state power exchange because it is missing direct mechanical governor emulation that is implemented in traditional virtual generator control schemes. To compensate the missing governor, a controllable current source 160/260 is virtually connected in parallel to the virtual generator part/VSM 150/250.

As mentioned above, in this disclosure, both terminals 100 and 200 of the grid intertie are using GFVCC. The transient power consumed by the VSM part 250 of the control on the second terminal 200 is used as a feedforward term, i.e. as a power-equivalent current reference, for the controllable current source 160 in the first terminal 100. In the same way, the transient power consumed by the virtual generator/VSM part 150 of the control on the first terminal 100 is used as a feedforward term, i.e. as a power-equivalent current reference, for the controllable current source 260 on the second terminal 200.

The setpoints are given as $$i_{1d,ref} = -\frac{2}{3} \cdot \frac{P_{tr}}{V_{pcc1,d}} - \frac{2}{3} \cdot \frac{P_{VSM2}}{V_{pcc1,d}} + i^*_{Vdc,ctrl}$$

$$i_{1q,ref} = \frac{2}{3} \cdot \frac{Q_{set,1}}{V_{pcc1,d}}$$

$$i^*_{1d} = i_{1d,ref} - i_{v1,d}$$

$$i^*_{1q} = i_{1q,ref} - i_{v1,q}$$

$$i_{2d,ref} = \frac{2}{3} \cdot \frac{P_{tr}}{V_{pcc2,d}} - \frac{2}{3} \cdot \frac{P_{VSM1}}{V_{pcc2,d}}$$

$$i_{2q,ref} = \frac{2}{3} \cdot \frac{Q_{set,2}}{V_{pcc2,d}}$$

$$i^*_{2d} = i_{2d,ref} - i_{v2,d}$$

$$i^*_{2q} = i_{2q,ref} - i_{v2,q}$$

$$P_{VSM2} = \frac{3}{2} \cdot (V_{pcc2,d} \cdot i_{v2,d} + V_{pcc2,q} \cdot i_{v2,q})$$

$$P_{VSM1} = \frac{3}{2} \cdot (V_{pcc1,d} \cdot i_{v1,d} + V_{pcc1,q} \cdot i_{v1,q})$$

with:

$V_{pcc1,d}$:=d-direction component of the PCC voltage measured at the first terminal of the grid intertie $V_{pcc1,q}$:=q-direction component of the PCC voltage measured at the first terminal of the grid intertie $V_{pcc2,d}$:=d-direction component of the PCC voltage measured at the second terminal of the grid intertie $V_{pcc2,q}$:=q-direction component of the PCC voltage measured at the second terminal of the grid intertie $i_{1d,ref}$:=d-direction component of the current reference for the virtual current source part of the control on the first terminal of the grid intertie $i_{1q,ref}$:=q-direction component of the current reference for the virtual current source part of the control on the first terminal of the grid intertie $i_{2d,ref}$:=d-direction component of the current reference for the virtual current source part of the control on the second terminal of the grid intertie $i_{2q,ref}$:=q-direction component of the current reference for the virtual current source part of the control on the second terminal of the grid intertie $P_{tr}$:=power transfer set-point for the steady-state power transferred between the first terminal and the second terminal of the grid intertie $P_{VSM1}$:=power consumed by the VSM part of the control on the first terminal $P_{VSM2}$:=power consumed by the VSM part of the control on the second terminal $i_{Vdc,ctrl}^*$:=current reference created with a dc-link voltage control $Q_{set,1}$:=set-point for the reactive power injected at the first terminal of the grid intertie $Q_{set,2}$:=set-point for the reactive power injected at the second terminal of the grid intertie $i_{1d}$*:=total d-direction current reference given to the current controller of the first terminal $i_{1q}$*:=total q-direction current reference given to the current controller of the first terminal $i_{2d}$*:=total d-direction current reference given to the current controller of the second terminal $i_{2q}$*=total q-direction current reference given to the current controller of the second terminal $i_{v1,d}$:=d-direction component of the current reference created with the VSM part of the control on the first terminal $i_{v1,q}$:=q-direction component of the current reference created with the VSM part of the control on the first terminal $i_{v2,d}$:=d-direction component of the current reference created with the VSM part of the control on the second terminal $i_{v2,q}$:=q-direction component of the current reference created with the VSM part of the control on the second terminal For simplicity, the dc-link voltage control may calculating the reference $i_{Vdc,ctrl}$* for the first terminal 100 only, however it may also be shared in between the first terminal 100 and terminal 200.

The feedforward terms $P_{VSM2}$ and $P_{VSM1}$ are calculated using $i_{v1d}$ and $i_{v2d}$ only, i.e. the active current created by the virtual spinning wheels of the VSMs. In steady-state, both feedforward terms become zero because $i_{v1d}$ and $i_{v2d}$ become zero. The first disclosed concept only emulates inertial responses on both terminals and takes the corresponding power from the opposite terminal to maintain the power balance. The steady-state characteristics are given by the power transfer set-point $P_{tr}$ and the reactive power defined with $Q_{set1}$, $Q_{set2}$ and the reactive power of the emulated virtual generators ($i_{v1q}$, $i_{v2q}$).

In embodiments below, two methods that provide not only transient grid support (inertial response), but also steady-state grid support are discussed.

The power transfer set-point $P_{tr}$ can be either a quantity calculated by a slow top-level controller (secondary or tertiary control, power trading) or it can contain in addition a part calculated with a droop curve for steady-state grid support based on the grid frequency on one terminal. More complex functions considering the grid frequencies on both terminals to determine $P_{tr}$ could also be possible as described below.

The current references, i.e. the feedforward terms, of the virtual generator part of the control method ($I_{v1,dq}$, $L_{v2,dq}$) are calculated with the unique feature of GFVCC that emulates a virtual generator response with the PLL and a virtual admittance. In GFVCC, it is possible to adjust the nominal power of the virtual generator and therefore the amount of grid support with a single factor kvsM. It can be set for each terminal independently, a feature, kvsM, that could be used to reduce the amount of grid support on the strong grid side of the terminal in order not to disturb the weak grid side too much. There are many implementation variants and options for GFVCC, such as current control in other reference frames, improved fault handling with kvsM factor, active damper branch in parallel with the current source and improved handling of asymmetric conditions.

Figure 13:
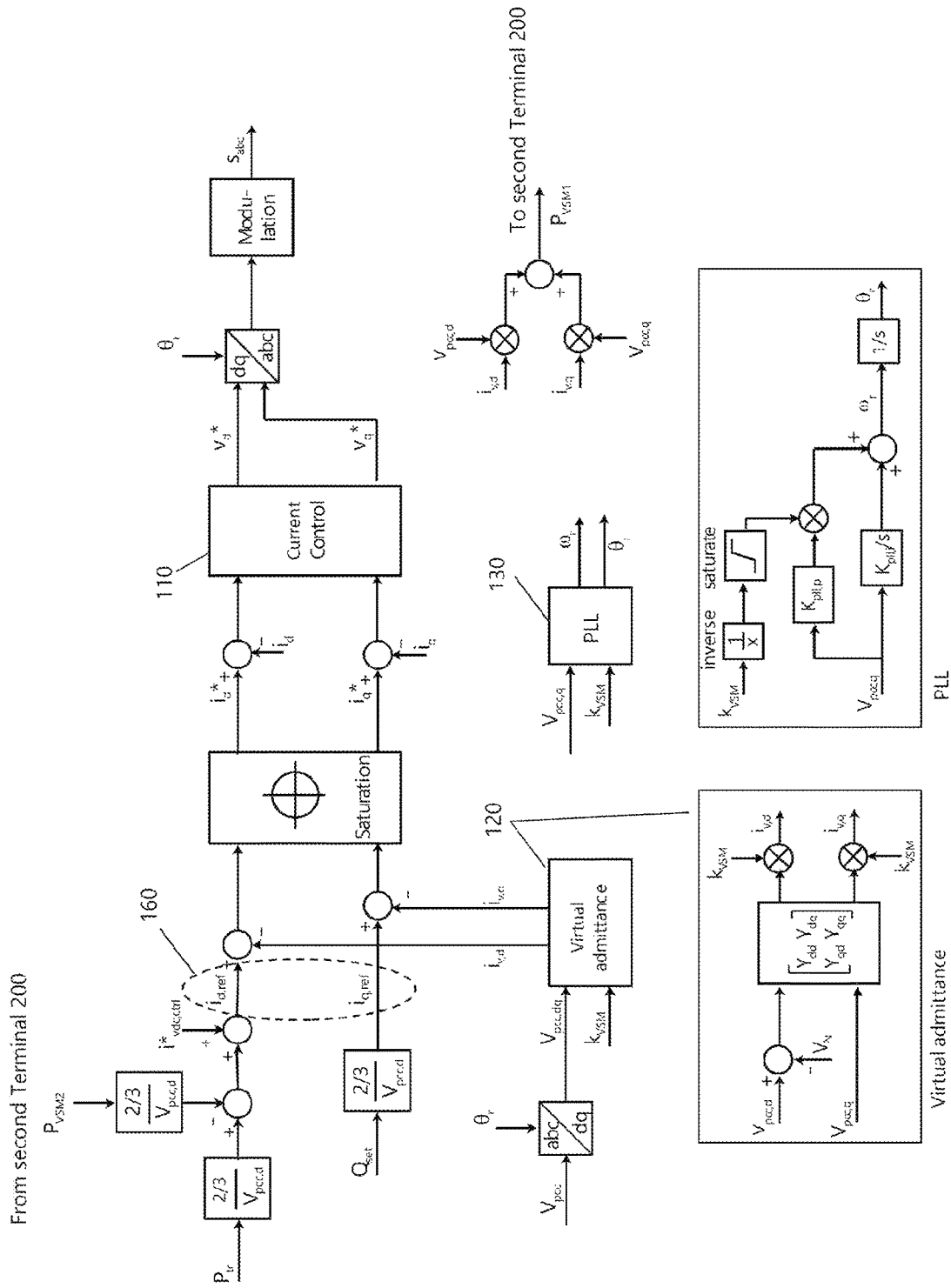
FIG. 13 shows a schematic block diagram of a control system for a terminal of a grid intertie according to the present disclosure.

FIG. 13 shows exemplarily a block diagram of the control system for the first terminal 100. It is understood by the skilled person that the control system for the second terminal is analogous. Insofar, the control system disclosed in the embodiment according to FIG. 13 is related to the block diagram of the control system depicted in FIG. 7.

FIG. 13 shows a block diagram of the control system for the first terminal 100 according to an embodiment having a first current control unit no, a first virtual admittance unit 120 and a phase locked loop (PLL) unit 130. The first virtual admittance unit 120 and the PLL unit 130 are configured to emulate an inertia of the VSM and a virtual current source 160 is connected in parallel to the VSM. In this embodiment, the transient power $P_{VSM2}$ consumed by the second VSM 250 of the second terminal 200 is used by a controller of the control system (controller not shown) to generate a power-equivalent current reference to control the first virtual current source. In addition, the transient power $F_{VSM1}$ consumed by the first VSM 150 is used by the controller of the control system to generate a power-equivalent current reference to control the second virtual current source 260 of the second terminal 200. It is understood by the skilled person that a block diagram of the control system for the second terminal 100 according to an embodiment would look correspondingly. Moreover, it is further understood by the skilled person that two control systems according to the embodiment depicted in FIG. 13 could be combined, one for the first terminal 100 and a second one for the second terminal 200, to form a control system for controlling a grid intertie according to the present disclosure.

According to an embodiment, a way to determine $P_{tr}$ is described in the following. If the controller of one terminal (e.g., the second terminal 200) is equipped with a typical droop curve, i.e. the terminal comprises a droop control unit, $P_{tr}$ is determined by the steady-state power flow determined by the droop curve and its offset $P_{set,2}$.

The equations above become $$i_{1d,ref} = -\frac{2}{3} \cdot \frac{P_{VSM2}}{V_{pcc1,d}} + i^*_{V_{dc,ctrl}}$$

$$i_{1q,ref} = \frac{2}{3} \cdot \frac{Q_{set,1}}{V_{pcc1,d}}$$

$$i^*_{1d} = i_{1d,ref} - i_{v1,d}$$

$$i^*_{1q} = i_{1q,ref} - i_{v1,q}$$

$$i_{2d,ref} = \frac{2}{3} \cdot \frac{P_{droop,2}}{V_{pcc2,d}} - \frac{2}{3} \cdot \frac{P_{VSM1}}{V_{pcc2,d}}$$

$$i_{2q,ref} = \frac{2}{3} \cdot \frac{Q_{set,2}}{V_{pcc2,d}}$$

$$i^*_{2d} = i_{2d,ref} - i_{v2,d}$$

$$i^*_{2q} = i_{2q,ref} - i_{v2,q}$$

$$P_{VSM2} = \frac{3}{2} \cdot (V_{pcc2,d} \cdot I_{v2,d} + V_{pcc2,q} \cdot I_{v2,q}) + P_{droop,2}$$

$$P_{VSM1} = \frac{3}{2} \cdot (V_{pcc1,d} \cdot I_{v1,d} + V_{pcc1,q} \cdot I_{v1,q})$$

with $P_{tr}$ being $$P_{tr} = P_{droop,2} = \overset{setpoint}{\overbrace{P_{set,2}}} - \overset{droop\ curve}{\overbrace{K_g(\omega_{g2} - \omega_{set,2})}}$$

and with:
$P_{droop,2}$:=steady state power on the second terminal
$K_g$:=droop constant
$\omega_{g2}$:=grid frequency measured at the second terminal
$\omega_{set,2}$:=frequency set-point for the second terminal The feedforward term $P_{VSM2}$ needs to be extended with the steady-state power $P_{droop,2}$ on the second terminal 200 determined by the droop curve. With the method according to this embodiment, the following characteristics can be achieved:

First Terminal 100: transient grid support (inertial response)

Second Terminal 200: full grid support, i.e. transient (inertial response) and steady-state It is understood by the skilled person that the behavior on the terminals could also be swapped.

According to another embodiment, a way to determine $P_{tr}$ is described in the following. If the controllers on both terminals are equipped with typical droop curves, $P_{tr}$ is determined by the difference of steady-state power flows determined by the droop curves and offset powers. The equations become $$i_{1d,ref} = \frac{2}{3} \cdot \frac{P_{droop,1}}{V_{pcc1,d}} - \frac{2}{3} \cdot \frac{P_{VSM2}}{V_{pcc1,d}} + i^*_{Vdc,ctrl}$$

$$i_{1q,ref} = \frac{2}{3} \cdot \frac{Q_{set,1}}{V_{pcc1,d}}$$

$$i^*_{1d} = i_{1d,ref} - i_{v1,d}$$

$$i^*_{1q} = i_{1q,ref} - i_{v1,q}$$

$$i_{2q,ref} = \frac{2}{3} \cdot \frac{P_{droop,2}}{V_{pcc2,d}} - \frac{2}{3} \cdot \frac{P_{VSM1}}{V_{pcc2,d}}$$

$$i_{2q,ref} = \frac{2}{3} \cdot \frac{Q_{set,2}}{V_{pcc2,d}}$$

$$i^*_{2d} = i_{2d,ref} - i_{v2,d}$$

$$i^*_{2q} = i_{2q,ref} - i_{v2,q}$$

$$P_{VSM2} = \frac{3}{2} \cdot (V_{pcc2,d} \cdot I_{v2,d} + V_{pcc2,q} \cdot I_{v2,q}) + P_{droop,2}$$

$$P_{VSM1} = \frac{3}{2} \cdot (V_{pcc1,d} \cdot I_{v1,d} + V_{pcc1,q} \cdot I_{v1,q}) + P_{droop,1}$$

$$P_{droop,1} = \overbrace{P_{set,1}}^{setpoint} - \overbrace{K_g(\omega_{g1} - \omega_{set,1})}^{droop\ curve}$$

and with:

$P_{droop,1}$:=steady state power on the first terminal $\omega_{g1}$:=grid frequency measured at the first terminal $\omega_{set,1}$:=frequency set-point for the first terminal The feedforward terms $P_{VSM2}$ and $P_{VSM1}$ need to be extended with the power flows determined by the droop curves on the opposite terminal.

The steady-state transferred power $P_{tr}$ gets $$P_{tr} = P_{droop,2} - P_{droop,1}$$

Assuming $\omega_{set,1} = \omega_{set,2}$, this leads to the following steady-state power transmission:

$$P_{tr} = P_{set,2} - P_{set,1} - K_g \cdot (\omega_{g2} - \omega_{g1})$$

By setting $$-P_{set,1} = P_{set,2} = \frac{P_{set,tr}}{2}$$

$P_{tr}$ can be achieved:

$$P_{tr} = P_{set,tr} - K_g \cdot (\omega_{g2} - \omega_{g1})$$

Figure 14:
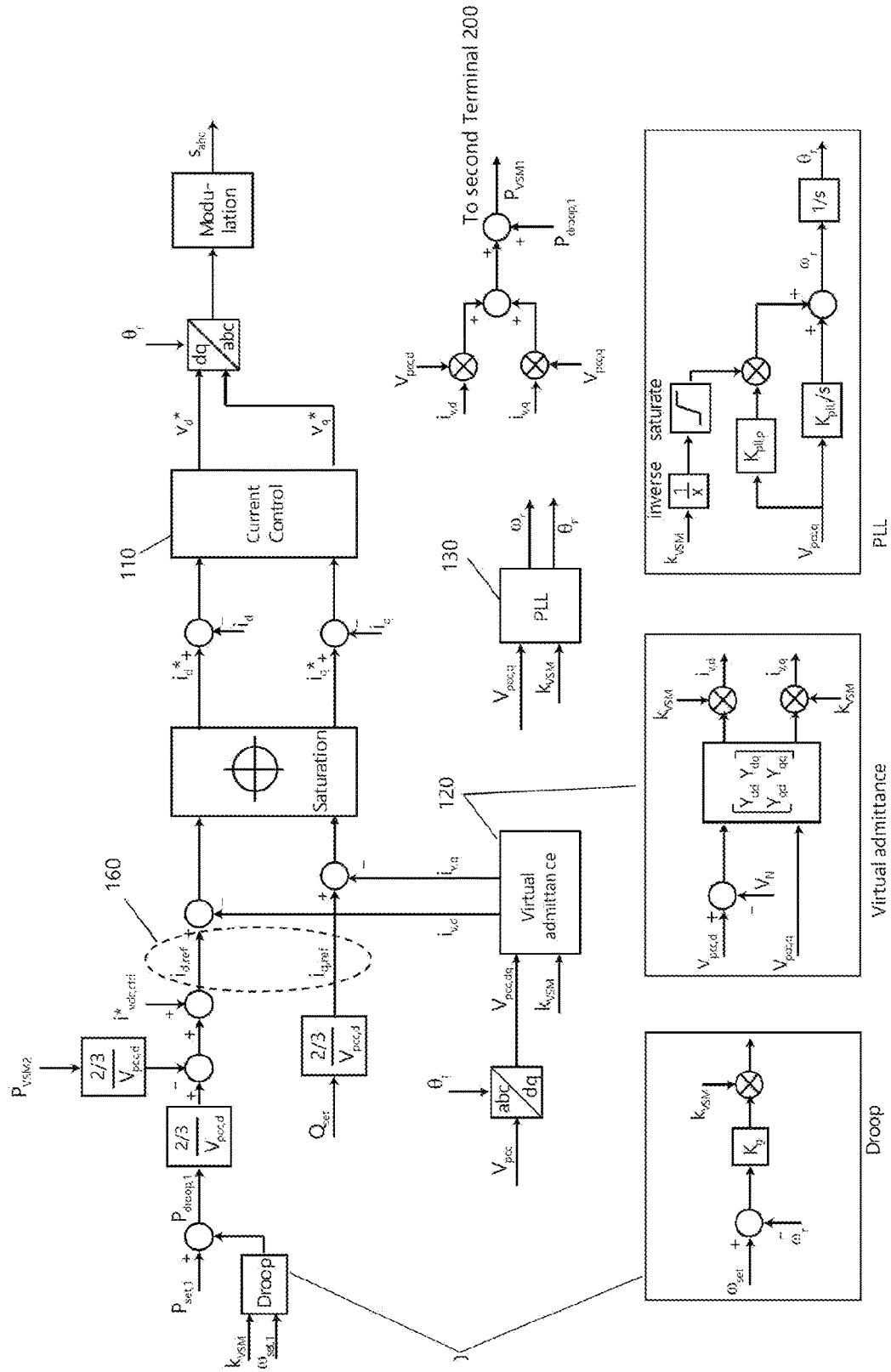
FIG. 14 shows a schematic block diagram of a control system for a terminal of a grid intertie according to the present disclosure.

The complete control scheme is depicted in FIG. 14.

With the method according to this embodiment, the following characteristics on the two terminals can be achieved:

Terminal 1: full grid support, i.e. transient (inertial response) and steady-state Terminal 2: full grid support, i.e. transient (inertial response) and steady-state.

FIG. 14 shows a block diagram of the control system for the first terminal 100 according to an embodiment having a first current control unit no, a first virtual admittance unit 120 and a phase locked loop (PLL) unit 130. The first virtual admittance unit 120 and the PLL unit 130 are configured to emulate an inertia of the VSM and a virtual current source 160 is connected in parallel to the VSM. In this embodiment, the power $P_{VSM2}$ consumed by the second VSM 250 of the second terminal 200 is used by a controller of the control system (controller not shown) to generate a power-equivalent current reference to control the first virtual current source.

In addition, the power $P_{VSM1}$ consumed by the first VSM 150 is used by the controller of the control system to generate a power-equivalent current reference to control the second virtual current source 260 of the second terminal 200. In addition, according to this embodiment, the control system further comprises a first droop control unit 140 and an output signal of the first droop control unit 140 is connected to the first virtual current source 160 in order to emulate a first speed governor. In other words, $P_{tr}$ as described according to one of the aforementioned embodiments can be determined using a control system according to the present embodiment.

It is further understood, that a control system for the second terminal 200 according to an embodiment would look correspondingly. Moreover, it is further understood by the skilled person that two control systems according to the embodiment depicted in FIG. 14 could be combined, one for the first terminal wo and a second one for the second terminal 200, to form a control system for controlling a grid intertie according to the present disclosure. It is further understood by the skilled person that one control system according to the embodiment depicted in FIG. 13 could be combined with one control system according to the embodiment depicted in FIG. 14, e.g., a control system according to the embodiment depicted in FIG. 13 for the first terminal wo and a control system according to the embodiment depicted in FIG. 14 for the second terminal 200 or vice versa, to form a control system for controlling a grid intertie according to the present disclosure.

Figure 15:
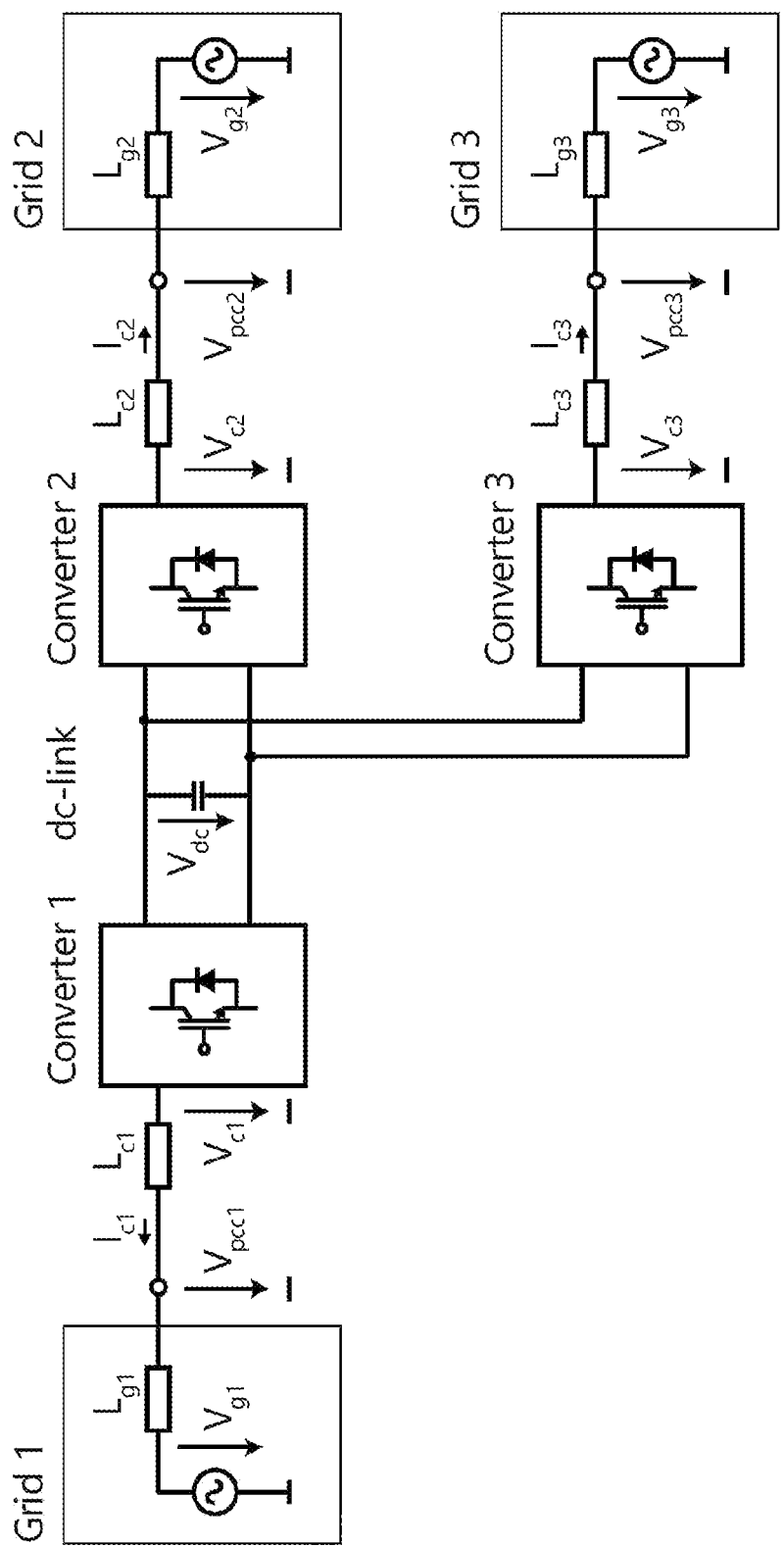
FIG. 15 shows a schematic diagram of a grid intertie according to the present disclosure.
Figure 16:
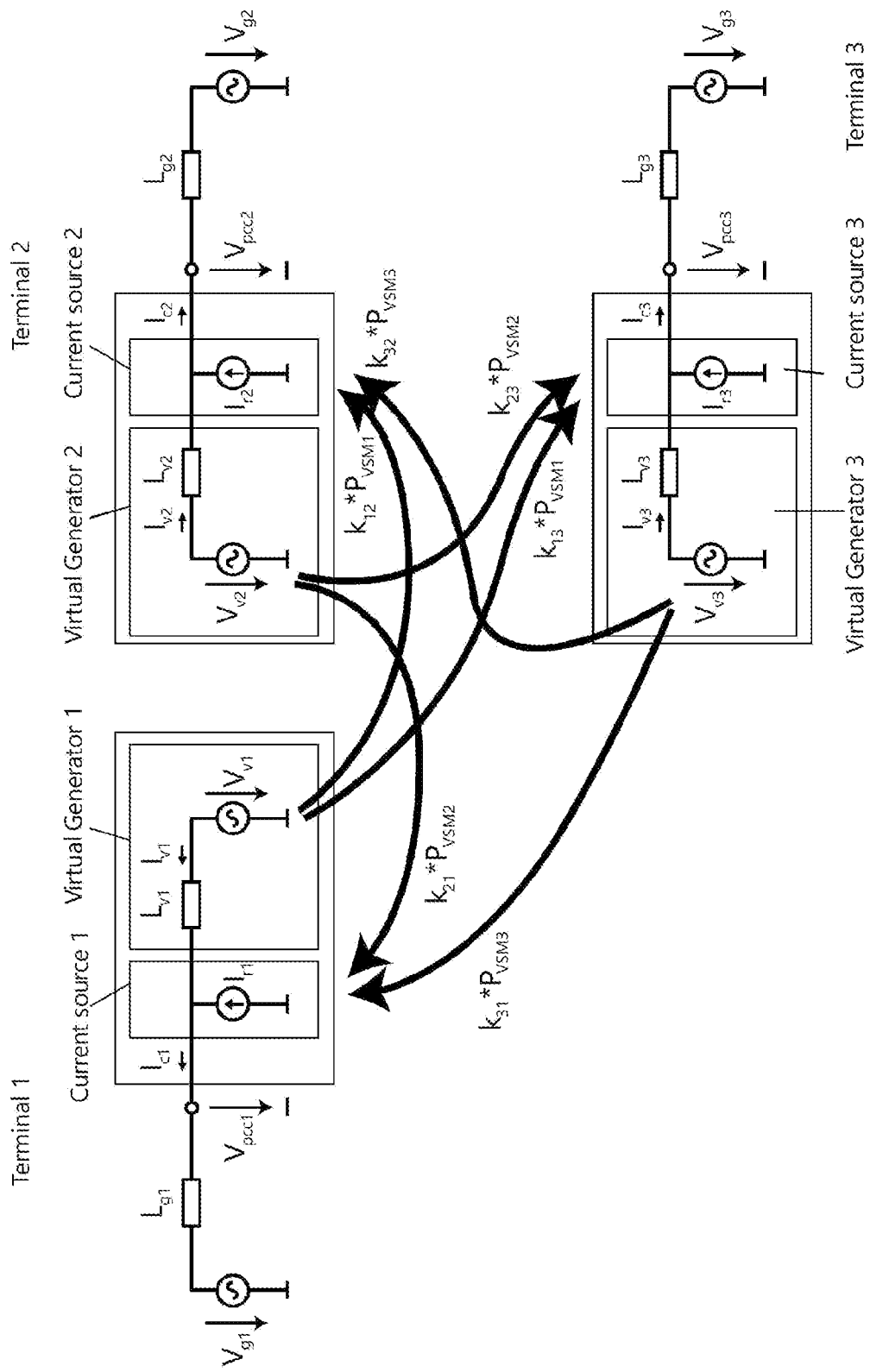
FIG. 16 shows a schematic diagram of a grid forming vector current control system for controlling a grid intertie according FIG. 15.

FIG. 16 shows a schematic block diagram of a grid forming vector current control system for controlling a grid intertie having three terminals as shown in FIG. 15. However, it is understood by the skilled person that the present disclosure is not limited to the three terminals but could also comprise any number of terminals. According to the present disclosure, all three terminals, the first terminal 100 connected to the first power grid A, the second terminal 200 connected to the second power grid B, and the third terminal 300 connected to the third power grid C are controlled using the GFVCC as described above. Thus, a controller of the control system uses the transient power $P_{VSM1}$ consumed by the first VSM and the transient power $P_{VSM2}$ consumed by the second VSM to generate a power-equivalent current reference to control the third virtual current source, uses the transient power $P_{VSM1}$ consumed by the first VSM and the transient power $P_{VSM3}$ consumed by the third VSM to generate a power-equivalent current reference to control the second virtual current source, and uses the transient power $P_{VSM2}$ consumed by the second VSM and the transient power $P_{VSM3}$ consumed by the third VSM to generate a power-equivalent current reference to control the first virtual current source.

In the case of three terminals, the equation set is given as follows:

$$i_{1d,ref} = \frac{2}{3} \cdot \frac{P_{droop,1}}{V_{pcc1,d}} - k_{21} \cdot \frac{2}{3} \cdot \frac{P_{VSM2}}{V_{pcc1,d}} - k_{31} \cdot \frac{2}{3} \cdot \frac{P_{VSM3}}{V_{pcc1,d}} + i^*_{Vdc,ctrl}$$

$$i_{1q,ref} = \frac{2}{3} \cdot \frac{Q_{set,1}}{V_{pcc1,d}}$$

$$i^*_{1d} = i_{1d,ref} - i_{v1,d}$$

$$i^*_{1q} = i_{1q,ref} - i_{v1,q}$$

$$i_{2d,ref} = \frac{2}{3} \cdot \frac{P_{droop,2}}{V_{pcc2,d}} - k_{12} \cdot \frac{2}{3} \cdot \frac{P_{VSM1}}{V_{pcc2,d}} - k_{32} \cdot \frac{2}{3} \cdot \frac{P_{VSM3}}{V_{pcc2,d}}$$

$$i_{2q,ref} = \frac{2}{3} \cdot \frac{Q_{set,2}}{V_{pcc2,d}}$$

$$i^*_{2d} = i_{2d,ref} - i_{v2,d}$$

$$i^*_{2q} = i_{2q,ref} - i_{v2,q}$$

$$i_{3d,ref} = \frac{2}{3} \cdot \frac{P_{droop,3}}{V_{pcc3,d}} - k_{13} \cdot \frac{2}{3} \cdot \frac{P_{VSM1}}{V_{pcc3,d}} - k_{23} \cdot \frac{2}{3} \cdot \frac{P_{VSM2}}{V_{pcc3,d}}$$

$$i_{3q,ref} = \frac{2}{3} \cdot \frac{Q_{set,3}}{V_{pcc3,d}}$$

$$i^*_{3d} = i_{3d,ref} - i_{v3,d}$$

$$i^*_{3q} = i_{3q,ref} - i_{v3,q}$$

$$P_{VSM3} = \frac{3}{2} \cdot (V_{pcc3,d} \cdot I_{v3,d} + V_{pcc3,q} \cdot I_{v3,q}) + P_{droop,3}$$

$$P_{VSM2} = \frac{3}{2} \cdot (V_{pcc2,d} \cdot I_{v2,d} + V_{pcc2,q} \cdot I_{v2,q}) + P_{droop,2}$$

$$P_{VSM1} = \frac{3}{2} \cdot (V_{pcc1,d} \cdot I_{v1,d} + V_{pcc1,q} \cdot I_{v1,q}) + P_{droop,1}$$

$$P_{droop,1} = \overbrace{P_{set,1}}^{setpoint} - \overbrace{K_g(\omega_{g1} - \omega_{set,1})}^{droop\ curve}$$

$$P_{droop,2} = \overbrace{P_{set,2}}^{setpoint} - \overbrace{K_g(\omega_{g2} - \omega_{set,2})}^{droop\ curve}$$

$$P_{droop,3} = \overbrace{P_{set,3}}^{setpoint} - \overbrace{K_g(\omega_{g3} - \omega_{set,3})}^{droop\ curve}$$

with $V_{pcc3,d}$:=d-direction component of the PCC voltage measured at the third terminal of the grid intertie $V_{pcc3,q}$:=q-direction component of the PCC voltage measured at the third terminal of the grid intertie $i_{3d,ref}$:=d-direction component of the current reference for the virtual current source part of the control on the third terminal of the grid intertie $P_{VSM3}$:=power consumed by the VSM part of the control on the third terminal $i_{3q,ref}$:=q-direction component of the current reference for the virtual current source part of the control on the third terminal of the grid intertie $Q_{set,3}$:=set-point for the reactive power injected at the third terminal of the grid intertie $i_{3d}^*$:=total d-direction current reference given to the current controller of the third terminal $i_{3q}^*$:=total q-direction current reference given to the current controller of the third terminal $i_{v3,d}$:=d-direction component of the current reference created with the VSM part of the control on the third terminal $i_{v3,q}$:=q-direction component of the current reference created with the VSM part of the control on the third terminal $P_{droop,3}$:=steady state power on the third terminal $\omega_{g3}$:=measured grid frequency at the third terminal $k_{12}$:=percentage of power consumed by the VSM part of the control on the first terminal supplied from the second terminal $k_{13}$:=percentage of power consumed by the VSM part of the control on the first terminal supplied from the third terminal $k_{21}$:=percentage of power consumed by the VSM part of the control on the second terminal supplied from the first terminal $k_{23}$:=percentage of power consumed by the VSM part of the control on the second terminal supplied from the third terminal $k_{31}$:=percentage of power consumed by the VSM part of the control on the third terminal supplied from the first terminal $k_{32}$:=percentage of power consumed by the VSM part of the control on the third terminal supplied from the second terminal It is important that the power distribution ratios sum up to 1:

$k_{12}+k_{13}=1$ $k_{21}+k_{23}=1$ $k_{31}+k_{32}=1$

Figure 17:
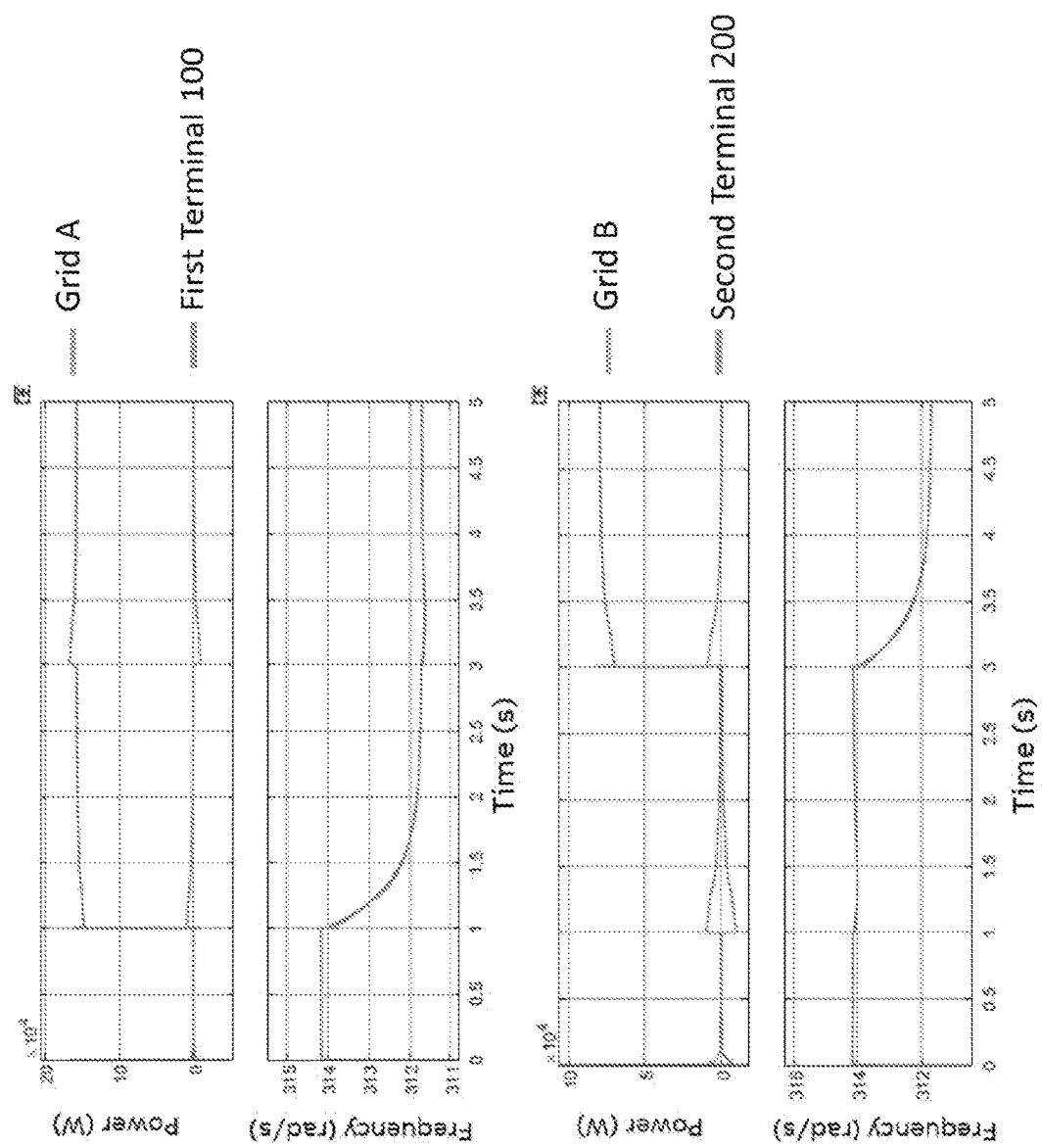
FIG. 17 shows a schematic illustration of the behavior of a grid forming vector current control system for controlling a grid intertie in transient grid support mode.

FIG. 17 shows a schematic illustration of the behavior of a grid forming vector current control system for controlling a grid intertie in transient grid support mode. In this embodiment, the power transfer setpoint for the intertie is set to zero. The first terminal 100 is exemplarily connected to a rather strong grid A with SCR=40 (short circuit ratio) and the second terminal 200 is exemplarily connected to a second grid B with SCR=20. At time t=1 s, a load step is applied in grid A. The intertie delivers transient power to the load step and takes the power from grid B. At time t=3 s, a load step with similar absolute magnitude is applied in grid B. The intertie delivers transient power to the load step and takes the power from grid A. In both cases the power flow decays to zero after a while because only transient power is exchanged. The intertie delivers inertial response on both terminals. A transparent link for transient power flow has been established.

Figure 18:
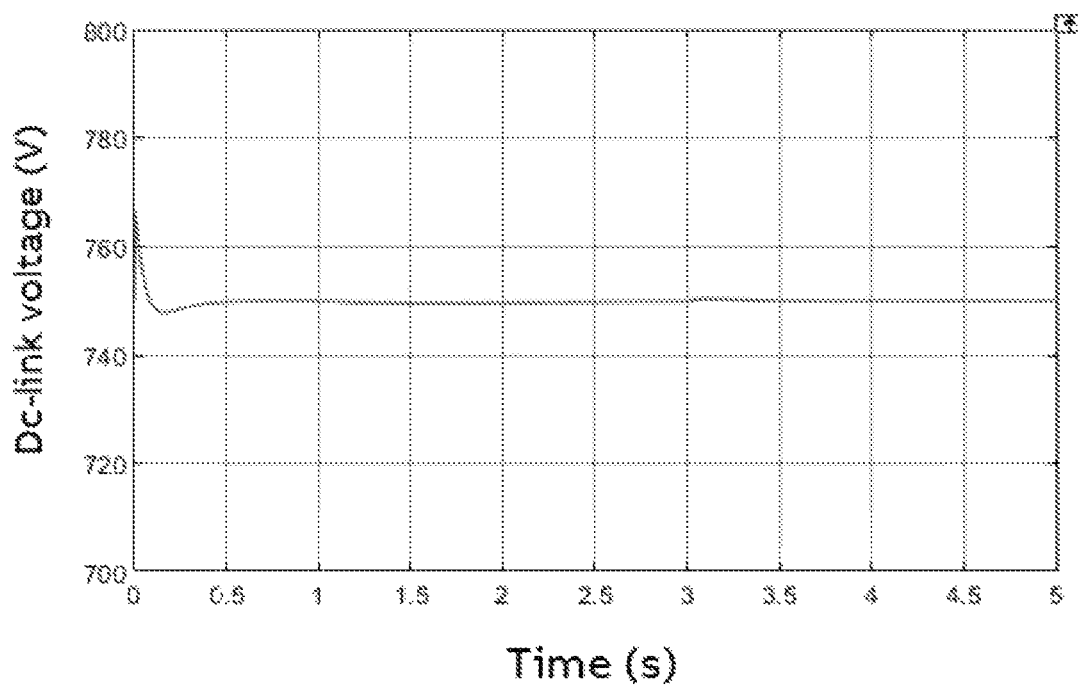
FIG. 18 shows a schematic illustration of the behavior of the dc-link voltage in transient grid support mode.

FIG. 18 shows a schematic illustration of the behavior of the dc-link voltage in transient grid support mode. Both transients have only minor impact on the dc-link voltage and the controller is able to maintain a stable dc-link. Although, according to this embodiment, a downscaled converter on the low-voltage level is used, the same behavior can be expected for medium voltage and high voltage setups.

Figure 19:
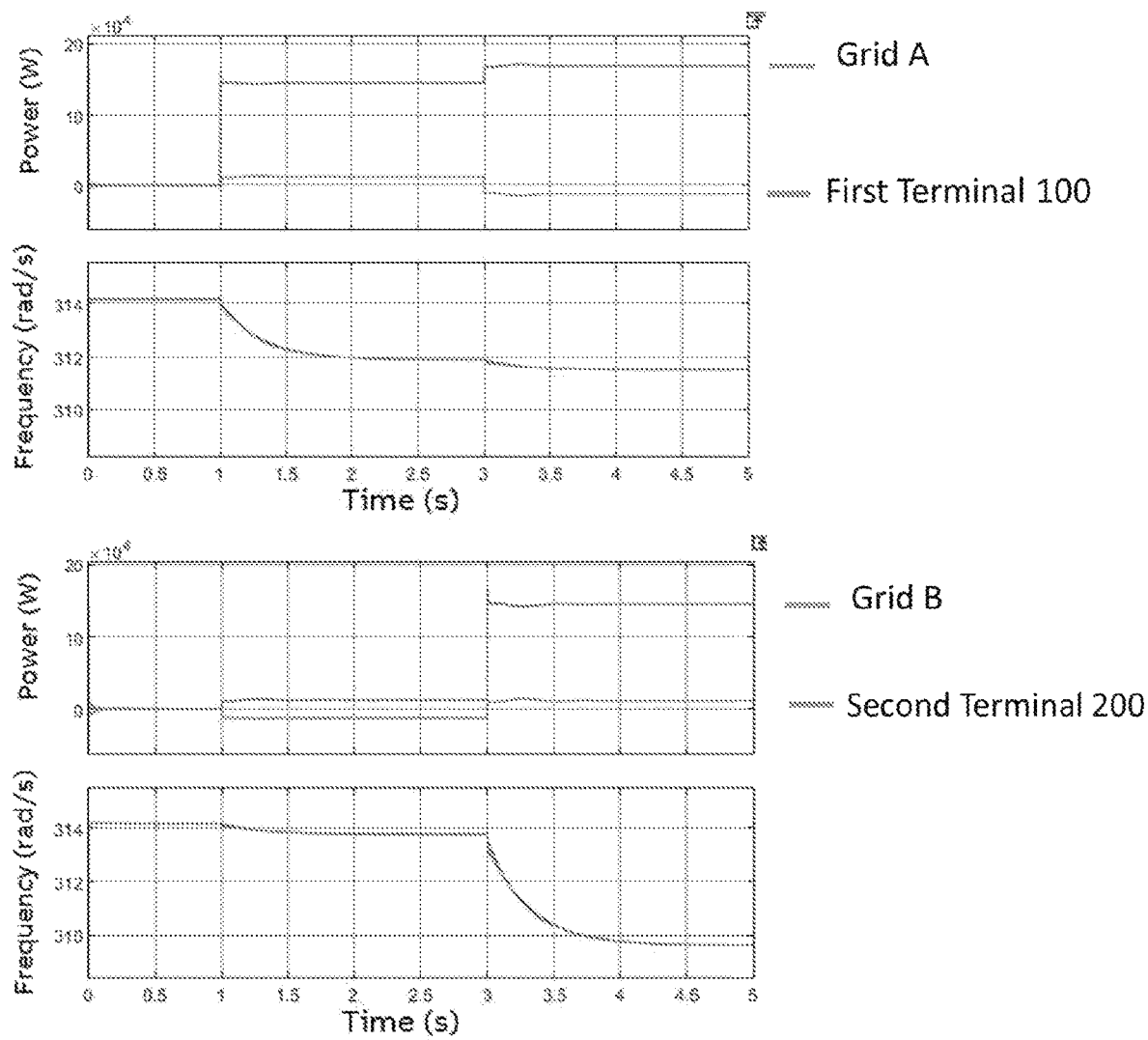
FIG. 19 shows a schematic illustration of the behavior of a grid forming vector current control system for controlling a grid intertie in full grid support mode.

FIG. 19 shows a schematic illustration of the behavior of a grid forming vector current control system for controlling a grid intertie in full grid support mode. According to this embodiment, two-sided full grid support (inertial response and steady-state support) is provided. The power transfer setpoint for the intertie is set to zero. The first terminal 100 is exemplarily connected to a rather strong grid A with SCR=40 and the second terminal 200 is exemplarily connected to a grid B with SCR=20. At time t=1 s, a load step is applied in grid A. The intertie delivers transient and steady-state power to the load step and takes the power from grid B. At time t=3 s, a load step with similar absolute magnitude is applied in grid B. Because grid B is weaker than grid A, the load step in per unit is higher and the grid frequency in grid B will fall to a lower value. Consequently, the power flow in the intertie will reverse and start to support grid B, which is heavier loaded compared to grid A. The intertie delivers transient and steady-state power to grid B and takes the power from grid A.

Figure 20:
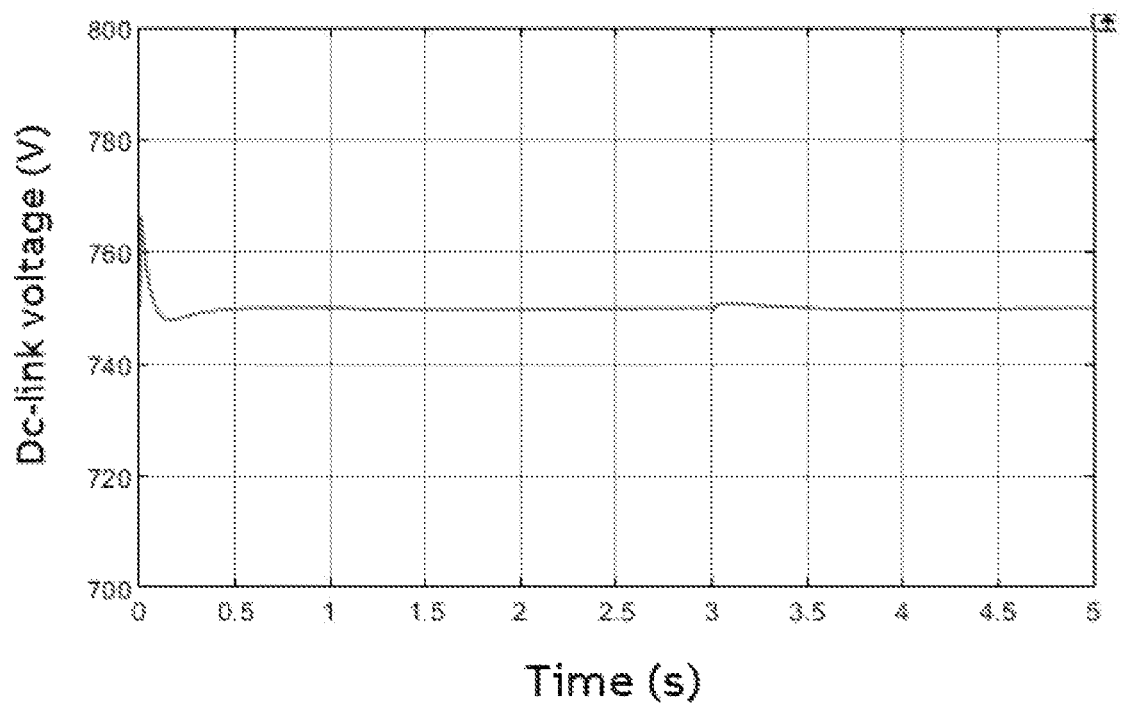
FIG. 20 shows a schematic illustration of the behavior of the dc-link voltage in full grid support mode.

FIG. 20 shows a schematic illustration of the behavior of the dc-link voltage in full grid support mode. Both transients have only minor impact on the dc-link voltage and the controller is able to maintain a stable dc-link. Although, according to this embodiment, a downscaled converter on the low-voltage level is used, the same behavior can be expected for medium voltage and high voltage setups.

Other aspects, features, and advantages will be apparent from the summary above, as well as from the description that follows, including the figures and the claims.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

Furthermore, in the claims the word "comprising" does not exclude other elements or steps, and the indefinite article "a" or "an" does not exclude a plurality. A single unit may fulfil the functions of several features recited in the claims. The terms "essentially", "about", "approximately" and the like in connection with an attribute or a value particularly also define exactly the attribute or exactly the value, respectively. Any reference signs in the claims should not be construed as limiting the scope.

REFERENCE NUMERALS

First terminal 100
First current control unit 110
First virtual admittance unit 120
First PLL unit 130
First droop control unit 140
First VSM 150
First virtual current source 160
Second terminal 200
Second current control unit 210
Second virtual admittance unit 220
Second PLL unit
Second virtual current source 260
First power grid A
Second power grid B
Third power grid C

The invention claimed is:

1. A grid forming vector current control system for controlling a grid intertie, the system comprising:
a first terminal configured to be connected to a first power grid, the first terminal comprising a first current control unit, a first virtual admittance unit, and a first phase locked loop (PLL), unit, wherein the first virtual admittance unit and the first PLL unit are configured to emulate an inertia of a first virtual synchronous machine (VSM) and a first virtual current source is connected in parallel to the first VSM;
a second terminal configured to be connected to a second power grid, the second terminal comprising a second current control unit, a second virtual admittance unit, and a second PLL unit, wherein the second virtual admittance unit and the second PLL unit are configured to emulate an inertia of a second VSM, and wherein a second virtual current source is connected in parallel to the second VSM; and
a controller configured to use transient power consumed by the first VSM to generate a power-equivalent current reference to control the second virtual current source and to use the transient power consumed by the second VSM to generate a power-equivalent current reference to control the first virtual current source.

2. The system according to claim 1, wherein the first terminal-further comprises a first droop control unit, wherein an output signal of the first droop control unit is connected to the first virtual current source in order to emulate a first speed governor and wherein the second terminal further comprises a second droop control unit and an output signal of the second droop control unit is connected to the second virtual current source in order to emulate a second speed governor.

3. The system according to claim 1, wherein the first terminal further comprises a first droop control unit, wherein an output signal of the first droop control unit is connected to the first PLL unit in order to emulate a first virtual mechanical speed governor and wherein the second terminal further comprises a second droop control unit and an output signal of the second droop control unit is connected to the second PLL unit in order to emulate a second virtual mechanical speed governor.

4. The system according to claim 1, wherein:
a first factor is configured to change characteristics of the first terminal continuously from voltage source to current source by proportionally scaling the output signals of the first virtual admittance with the first factor; and
a second factor is configured to change the characteristics of the second terminal continuously from voltage source to current source by proportionally scaling the output signals of the second virtual admittance with the second factor.

5. The system according to claim 4, wherein
the first terminal further comprises a first droop control unit;
the second terminal further comprises a second droop control unit;
at least one of the first droop control unit, the first virtual admittance unit or the first PLL unit is configured to receive the first factor in order to increase or decrease the inertial response of the first terminal to disturbances in the first grid;
at least one of the second droop control unit, the second virtual admittance unit or the second PLL unit is configured to receive the second factor in order to increase or decrease the inertial response of the second terminal to disturbances in the second grid; and
the first factor scales a nominal power of the first VSM by proportionally scaling the output signals of the first virtual admittance with the first factor, inversely proportionally scaling the proportional gain of the first PLL unit with the first factor, and proportionally scaling a first droop constant with the first factor; and
the second factor scales a nominal power of the second VSM by proportionally scaling the output signals of the second virtual admittance with the second factor, inversely proportionally scaling the proportional gain of the second PLL unit with $k_{VSM2}$, and proportionally scaling a second droop constant with the second factor.

6. The system according to claim 4, wherein the first and second factors scale at least one of a spinning wheel factor or a transient power or the inertia.

7. The system according to claim 4, wherein the first terminal further comprises a first droop control unit and an output signal of the first droop control unit is connected to the first virtual current source in order to emulate a first speed governor and wherein the second terminal further comprises a second droop control unit and an output signal of the second droop control unit is connected to the second virtual current source in order to emulate a second speed governor.

8. The system according to claim 4, wherein the first terminal further comprises a first droop control unit and an output signal of the first droop control unit is connected to the first PLL unit in order to emulate a first virtual mechanical speed governor and wherein the second terminal further comprises a second droop control unit and an output signal of the second droop control unit is connected to the second PLL unit in order to emulate a second virtual mechanical speed governor.

9. The system according to claim 1, further comprising:
a third terminal configured to be connected to a third power grid, the third terminal comprising a third droop control unit, a third current control unit, a third virtual admittance unit, and a third PLL unit, wherein the third virtual admittance unit and the third PLL unit are configured to emulate an inertia of a third VSM and a third virtual current source is connected in parallel to the third VSM; and
wherein the controller is configured to:
use the transient power consumed by the first VSM and the transient power consumed by the second VSM to generate a power-equivalent current reference to control the third virtual current source,
use the transient power consumed by the first VSM and transient power consumed by the third VSM to generate a power-equivalent current reference to control the second virtual current source, and
use the transient power consumed by the second VSM and the transient power consumed by the third VSM to generate a power-equivalent current reference to control the first virtual current source.

10. The system according to claim 1, wherein the first terminal further comprises a first droop control unit and an output signal of the first droop control unit is connected to the first virtual current source in order to emulate a first speed governor.

11. The system according to claim 1, wherein the first terminal further comprises a first droop control unit and an output signal of the first droop control unit is connected to the first PLL unit in order to emulate a first virtual mechanical speed governor.

12. A method for controlling a grid intertie, the method comprising:
providing a first terminal configured to be connected to a first power grid, the first terminal comprising a first current control unit, a first virtual admittance unit, and a first phase locked loop (PLL) unit;
emulating, with the first virtual admittance unit and the first PLL unit, an inertia of a first virtual synchronous machine VSM;
providing a first virtual current source connected in parallel to the first VSM;
providing a second terminal configured to be connected to a second power grid, the second terminal comprising a second current control unit, a second virtual admittance unit, and a second PLL unit;
emulating, with the second virtual admittance unit and the second PLL unit, an inertia of a second VSM;
providing a second virtual current source connected in parallel to the second VSM; and
using transient power consumed by the first VSM to generate a power-equivalent current reference to control the second virtual current source and using transient power consumed by the second VSM to generate a power-equivalent current reference to control the first virtual current source.

13. The method according to claim 12, wherein the first terminal further comprises a first droop control unit and wherein the method further comprises connecting an output signal of the first droop control unit to the first virtual current source in order to emulate a first speed governor; and
wherein the second terminal further comprises a second droop control unit and wherein the method further comprises connecting an output signal of the second droop control unit to the second virtual current source in order to emulate a second speed governor.

14. The method according to claim 12, wherein the first terminal further comprises a first droop control unit and wherein the method further comprises connecting an output signal of the first droop control unit to the first PLL unit in order to emulate a first virtual mechanical speed governor; and
wherein the second terminal further comprises a second droop control unit and wherein the method further comprises connecting an output signal of the second droop control unit to the second PLL unit in order to emulate a second virtual mechanical speed governor.

15. The method according to claim 12, comprising:
applying a first factor to change characteristics of the first terminal continuously from voltage source to current source by proportionally scaling the output signals of the first virtual admittance with the first factor; and
applying a second factor to change characteristics of the second terminal continuously from voltage source to current source by proportionally scaling the output signals of the second virtual admittance with the second factor.

16. The method according to claim 15, comprising:
feeding the first factor into at least one of the first droop control unit, the first virtual admittance unit or the first PLL unit in order to increase or decrease the inertial response of the first terminal to disturbances in the first grid;
feeding the second factor into at least one of the second droop control unit, the second virtual admittance unit or the second PLL unit in order to increase or decrease the inertial response of the second terminal to disturbances in the second grid;
scaling, with the first factor, a nominal power of the first VSM by proportionally scaling the output signals of the first virtual admittance with the first factor, inversely proportionally scaling the proportional gain of the first PLL unit with the first factor, and proportionally scaling a first droop constant with the first factor; and
scaling, with the second factor, a nominal power of the second VSM by proportionally scaling the output signals of the second virtual admittance with the second factor, inversely proportionally scaling the proportional gain of the second PLL unit with the second factor, and proportionally scaling a second droop constant with the second factor.

17. The method according to claim 15, comprising scaling, with the first and second factors, at least one of a spinning wheel factor or a transient power or the inertia.

18. The method according to claim 12, further comprising:
- providing a third terminal configured to be connected to a third power grid, the third terminal comprising a third current control unit, a third virtual admittance unit, and a third PLL unit;
- emulating, with the third virtual admittance unit and the third PLL unit, an inertia of a third VSM;
- providing a third virtual current source connected in parallel to the third VSM;
- using the transient power consumed by the first VSM and the transient power consumed by the second VSM to generate a power-equivalent current reference to control the third virtual current source;
- using the transient power consumed by the first VSM and transient power consumed by the third VSM to generate a power-equivalent current reference to control the second virtual current source; and
- using the transient power consumed by the second VSM and the transient power consumed by the third VSM to generate a power-equivalent current reference to control the first virtual current source.

\* \* \* \* \*

UNITED STATES PATENT AND TRADEMARK OFFICE
CERTIFICATE OF CORRECTION

PATENT NO. : 11,735,928 B2  
APPLICATION NO. : 17/919354  
DATED : August 22, 2023  
INVENTOR(S) : Schweizer et al.

It is certified that error appears in the above-identified patent and that said Letters Patent is hereby corrected as shown below:

In the Claims

In Column 25, in Claim 1, Line 58, delete "(PLL)," and insert -- (PLL) --.

In Column 26, in Claim 1, Line 7, delete "use the" and insert -- use --.

In Column 26, in Claim 2, Line 11, delete "terminal-further" and insert -- terminal further --.

In Column 26, in Claim 2, Line 14, delete "governor" and insert -- governor, --.

In Column 26, in Claim 3, Line 23, delete "governor" and insert -- governor, --.

In Column 26, in Claim 4, Line 33, delete "change the" and insert -- change --.

In Column 26, in Claim 5, Line 63, delete "$K_{VSM2}$," and insert -- the second factor, --.

In Column 27, in Claim 12, Line 59, delete "VSM;" and insert -- (VSM); --.

Signed and Sealed this  
Twenty-seventh Day of August, 2024

Katherine Kelly Vidal  
*Director of the United States Patent and Trademark Office*